(12) United States Patent
Spranger et al.

(10) Patent No.: US 12,508,062 B2
(45) Date of Patent: Dec. 30, 2025

(54) CRYOGENIC THERAPY SYSTEMS AND METHODS

(71) Applicant: Pacira CryoTech, Inc., Parsippany, NJ (US)

(72) Inventors: John Spranger, Hingham, MA (US); Roy Winston, Tampa, FL (US); Jared Ham, Severn, MA (US); Jonathan Slonin, Palm City, FL (US)

(73) Assignee: Pacira CryoTech, Inc., Parsippany, NJ (US)

( * ) Notice: Subject to any disclaimer, the term of this patent is extended or adjusted under 35 U.S.C. 154(b) by 403 days.

(21) Appl. No.: 18/172,133

(22) Filed: Feb. 21, 2023

(65) Prior Publication Data

US 2023/0277233 A1    Sep. 7, 2023

Related U.S. Application Data

(60) Provisional application No. 63/329,286, filed on Apr. 8, 2022, provisional application No. 63/313,698, filed on Feb. 24, 2022.

(51) Int. Cl.
*A61B 18/02* (2006.01)
*A61B 18/00* (2006.01)

(52) U.S. Cl.
CPC ... *A61B 18/0218* (2013.01); *A61B 2018/00434* (2013.01); *A61B 2018/025* (2013.01); *A61B 2018/0293* (2013.01)

(58) Field of Classification Search
CPC .............. A61B 18/0218; A61B 18/02; A61B 2018/00434; A61B 2018/025;
(Continued)

(56) References Cited

U.S. PATENT DOCUMENTS

| 7,713,266 B2 | 5/2010 | Elkins et al. |
| 7,850,683 B2 | 12/2010 | Elkins et al. |

(Continued)

FOREIGN PATENT DOCUMENTS

| WO | WO 2010/075438 | 7/2010 |
| WO | WO 2010/075448 | 7/2010 |

(Continued)

OTHER PUBLICATIONS

Abrich et al., Jan. 10, 2017, Left stellate ganglion block: increasing clinical awareness in the eye of the electrical storm, American College of Cardiology, 7 pp.

(Continued)

*Primary Examiner* — Ankit D Tejani
*Assistant Examiner* — Joshua Brendon Solomon
(74) *Attorney, Agent, or Firm* — Knobbe, Martens, Olson & Bear LLP

(57) ABSTRACT

A method of interrupting sympathetic stimulation to the cardiovascular system of a patient in need thereof includes navigating a probe of a hand-held cryogenic therapy apparatus to a stellate ganglion or an autonomic tissue area peripheral to the stellate ganglion of the patient, the probe including a needle configured to produce a cooling zone for focused cryogenic therapy, aligning the needle with one or more desired nerves of the stellate ganglion or the autonomic tissue area peripheral to the stellate ganglion, and producing the cooling zone to provide cryogenic therapy to the desired nerves of the stellate ganglion or the autonomic tissue area peripheral to the stellate ganglion at a temperature sufficient to cause axonotmesis of the nerves.

31 Claims, 14 Drawing Sheets

(58) Field of Classification Search
CPC .. A61B 2018/0293; A61B 2018/00041; A61B 2018/00172; A61B 2018/00577; A61B 2018/00791; A61B 2018/0262; A61B 2018/00011; A61B 2018/00351; A61B 2018/00964; A61B 2018/0231; A61B 2017/3413; A61B 17/3403; A61F 2007/0087; A61F 7/12
See application file for complete search history.

(56) References Cited

U.S. PATENT DOCUMENTS

| | | | |
|---|---|---|---|
| 8,298,216 | B2 | 10/2012 | Burger et al. |
| 8,409,185 | B2 | 4/2013 | Burger et al. |
| 9,039,688 | B2 | 5/2015 | Palmer et al. |
| 9,254,162 | B2 | 2/2016 | Burger et al. |
| 10,085,881 | B2 | 10/2018 | Karnik et al. |
| 11,134,998 | B2 | 10/2021 | Cross et al. |
| 2012/0089211 | A1 | 4/2012 | Curtis et al. |
| 2015/0065945 | A1* | 3/2015 | Zarins .............. A61B 18/04 514/183 |
| 2018/0116705 | A1 | 5/2018 | Lee et al. |
| 2020/0100828 | A1* | 4/2020 | Guzman ............ A61B 18/02 |
| 2021/0330927 | A1 | 10/2021 | Guzman |
| 2022/0133381 | A1* | 5/2022 | Prologo ........... A61B 5/6852 606/21 |
| 2024/0382250 | A1* | 11/2024 | Kamat ............ A61B 18/1492 |

FOREIGN PATENT DOCUMENTS

| | | | | |
|---|---|---|---|---|
| WO | WO 2013/134452 | | 9/2013 | |
| WO | WO 2020/163854 | | 8/2020 | |
| WO | WO-2020163854 | A1* | 8/2020 | ............ A61B 90/90 |
| WO | WO-2022266327 | A1* | 12/2022 | ........... A61B 5/4893 |

OTHER PUBLICATIONS

Chatzidou et al., 2021, Cryoablation of stellate ganglion for the management of electrical storm: the first reported case, European Society of Cardiology, EP Case Report, 2 pp.

Chaudhry et al., Aug. 2018, Detection of the Stellate and Thoracic Sympathetic ChainGanglia with High-Resolution 3D-CISS MR Imaging, AJNR Am J Neuroradiol 39:1550-1554.

Garcia-Moran et al., 2016, Refractory electrical storm: a role for transient sympathetic blockade, Scientific Letters/Rev Esp Cardiol., 69:(1):75-85.

Hayase et al., Aug. 2013, Percutaneous Stellate Ganglion Block Suppressing VT and VF in a Patient Refractory to VT Ablation, Cardiovasc Electrophysiol. 24(8):1-6.

Leiria et al., 2011, Longterm effects of cardiac mediastinal nerve cryoablation on neural inducibility of atrial fibrillation in canines, Autonomic Neuroscience: Basic and Clinical, 161:68-74.

Meng et al., 2017, Efficacy of Stellate Ganglion Blockade in Managing Electrical Storm, JACC: Clinical Electrophysiology, 3(9):942-949.

Rebecchi et al., 2021, Atrial fibrillation and autonomic nervous system: A translational approach to guide therapeutic goals, Journal of Arrhythmia, 37:320-330.

Shelton et al., May 2018, Effects of Stellate Ganglion Cryoablation on Subcutaneous Nerve Activity and Atrial Tachyarrhythmias in a Canine Model of Pacing Induced Heart Failure, JACC Clin Electrophysiol. 4(5):686-695.

Tian et al., Sep. 2019, Effective Use of Percutaneous Stellate Ganglion Blockade in Patients With Electrical Storm, Circ Arrhythm Electrophysiol. 2019;12:e007118.

International Search Report and Written Opinion mailed Apr. 26, 2023 for PCT Application No. PCT/US2023/062945, filed Feb. 21, 2023 in 6 pages.

* cited by examiner

CRYOGENIC THERAPY SYSTEMS AND METHODS

INCORPORATION BY REFERENCE PRIORITY APPLICATION

The present application claims the benefit of priority to U.S. Provisional Application No. 63/329,286, filed Apr. 8, 2022, and U.S. Provisional Application No. 63/313,698, filed Feb. 24, 2022, each of which is incorporated by reference in its entirety.

BACKGROUND

Field

This disclosure relates generally to methods of performing cryogenic therapy on the stellate ganglion for managing structural heart conditions.

Description of the Related Art

Electrical storm refers to the occurrence of multiple episodes (for example, three episodes) of ventricular arrhythmias (for example, ventricular tachycardia (VT) or ventricular fibrillation (VF)) within a short period of time (for example, 24 hours). In some patients, the heart can be predisposed to ventricular arrhythmias due to myocardial infarction and/or structural abnormalities that may result in re-entrant electrical pathways or increased sensitivity to catecholamines which lead to electrical storm that can be resistant to traditional anti-arrhythmic medications.

The stellate ganglion provides sympathetic innervation to the heart. The stellate ganglion is split into the left stellate ganglion and the right stellate ganglion, each of which innervates different portions of the heart. The left stellate ganglion provides greater innervation to the ventricles in comparison to the right stellate ganglion. Blockade of the stellate ganglion (for example, the left stellate ganglion or both the left stellate ganglion and the right stellate ganglion) can reduce the amount of positive catecholamines (for example, epinephrine and norepinephrine) at the heart and increase the level of input and stimulation needed for fibrillation of the ventricles. The stellate ganglion is formed by a fusion of the C7, C8, and T1 regions (for example, the C7, C8, and T1 ganglia) of the paravertebral chain. In some individuals, the stellate ganglion can also include the T2 region (for example, the T2 ganglia) of the paravertebral chain. In some individuals, the stellate ganglion can also include the T3 region (for example, the T3 ganglia) of the paravertebral chain. In other individuals, the T2 region and/or the T3 region are not part of the stellate ganglion. In some individuals, the T1 nerve and/or the T2 nerve can provide sympathetic stimulation to the heart at least partially through alternative pathways that bypass the stellate ganglion.

Current treatments for electrical storm include excision of a portion of the stellate ganglion. Treatment for electrical storm has also been attempted using a left stellate ganglion block, in which a local anesthetic is injected into the stellate ganglion to temporarily interrupt sympathetic stimulation to the heart. Sympathetic inhibition has been found to suppress ventricular arrhythmias, such as those taking place during electrical storm.

SUMMARY

Some aspects of the present disclosure relate to a method of interrupting sympathetic stimulation to the cardiovascular system of a patient in need thereof. The method includes navigating a probe of a hand-held cryogenic therapy apparatus to a stellate ganglion or an autonomic tissue area peripheral to the stellate ganglion of the patient, the probe including a needle configured to produce a cooling zone for focused cryogenic therapy, aligning the needle with one or more desired nerves of the stellate ganglion or the autonomic tissue area peripheral to the stellate ganglion, and producing the cooling zone to provide cryogenic therapy to the desired nerves of the stellate ganglion or the autonomic tissue area peripheral to the stellate ganglion at a temperature sufficient to cause axonotmesis of the nerves.

The temperature can be between −20° C. and −100° C. The temperature can be between −80° C. and −90° C. The temperature can be −88° C. The cryogenic therapy to the one or more desired nerves of the stellate ganglion or the autonomic tissue area peripheral to the stellate ganglion can be administered for between 1 minute and 4 minutes. Navigating the probe to the stellate ganglion or the autonomic tissue area peripheral to the stellate ganglion can include inserting the probe percutaneously. Navigating the probe to the stellate ganglion or the autonomic tissue area peripheral to the stellate ganglion can include inserting the probe in an open surgery. Navigating the probe to the stellate ganglion or the autonomic tissue area peripheral to the stellate ganglion can include guiding the probe using fluoroscopic or ultrasound imaging. The method can further include inserting one or more dilators or guides into the patient to form a pathway for navigation of the probe to the stellate ganglion or the autonomic tissue area peripheral to the stellate ganglion. Producing the cooling zone can include forming an ice-ball about an outer surface of the needle. The patient can be a patient who has suffered from or is at risk of suffering from atrial tachyarrhythmia or refractory atrial tachyarrhythmia. The patient can be a patient who has suffered from or is at risk of suffering from ventricular arrhythmia, ventricular tachycardia, ventricular fibrillation, refractory ventricular arrhythmia, refractory ventricular tachycardia, or refractory ventricular fibrillation. The patient can be a patient who has suffered from or is at risk of suffering from a cardiac arrhythmia selected from the group consisting of long QT syndrome, ischemic cardiomyopathy, dilated cardiomyopathy, valvular heart disease, acute myocardial infarction, and ongoing myocardial ischemia, and combinations thereof. The patient can be a patient who has an implantable cardioverter-defibrillator (ICD). The cryogenic therapy can result in temporarily interruption of sympathetic stimulation to the cardiovascular system for up to 1, 2, 3, 4, 5, or 6 months. The cryogenic therapy can cause regeneration of the treated nerves of stellate ganglion or the autonomic tissue area peripheral to the stellate ganglion. The cryogenic therapy can cause regeneration of one or more sodium channels of the treated nerves of the stellate ganglion or the autonomic tissue area peripheral to the stellate ganglion. The one or more desired nerves of the stellate ganglion or the autonomic tissue area peripheral to the stellate ganglion can include one or more desired nerves of the stellate ganglion. The one or more desired nerves of the stellate ganglion can include one or more desired nerves of a left stellate ganglion. The one or more desired nerves of the stellate ganglion or the autonomic tissue area peripheral to the stellate ganglion can include one or more desired nerves of the autonomic tissue area peripheral to the stellate ganglion. The one or more desired nerves of the stellate ganglion or the autonomic area peripheral to the stellate ganglion can include one or more desired nerves of a paravertebral chain. In certain embodiments, the one or more desired nerves of the paravertebral chain can include one or more desired nerves of one or more of a C7 region of the paravertebral chain, a C8 region of the paravertebral chain, a T1 region of the paravertebral chain, and a T2 region of the paravertebral chain. In certain embodiments, the one or more desired nerves of the paravertebral chain can include one or more desired nerves of the T1 region of the paravertebral chain and/or the T2 region of the paravertebral chain.

Some aspects of the present disclosure relate to a method of treating a patient suffering from cardiac electrical storm. The method includes providing cryogenic therapy to one or more desired nerves of a stellate ganglion or an autonomic tissue area peripheral to the stellate ganglion of the patient. Providing the cryogenic therapy includes navigating a probe of a hand-held cryogenic therapy apparatus to the stellate ganglion or the autonomic tissue area peripheral to the stellate ganglion of the patient, the probe including a needle configured to produce a cooling zone for focused cryogenic therapy, aligning the needle with the one or more desired nerves of the stellate ganglion or the autonomic tissue area peripheral to the stellate ganglion, and producing the cooling zone to provide cryogenic therapy to the desired nerves of the stellate ganglion or the autonomic tissue area peripheral to the stellate ganglion at a temperature sufficient to cause axonotmesis of the nerves.

The method can further include selecting or identifying a patient who has suffered from or is at risk of suffering from cardiac electrical storm. The temperature can be between −20° C. and −100° C. The temperature can be between −80° C. and −90° C. The temperature can be −88° C. The cryogenic therapy to the one or more desired nerves of the stellate ganglion or the autonomic tissue area peripheral to the stellate ganglion can be administered for between 1 minute and 4 minutes. Navigating the probe to the stellate ganglion or the autonomic tissue area peripheral to the stellate ganglion can include inserting the probe percutaneously. Navigating the probe to the stellate ganglion or the autonomic tissue area peripheral to the stellate ganglion can include inserting the probe in an open surgery. Navigating the probe to the stellate ganglion or the autonomic tissue area peripheral to the stellate ganglion can include guiding the probe using fluoroscopic or ultrasound imaging. The method can further include inserting one or more dilators or guides into the patient to form a pathway for navigation of the probe to the stellate ganglion or the autonomic tissue area peripheral to the stellate ganglion. Producing the cooling zone can include forming an ice-ball about an outer surface of the needle. The patient can be a patient who has suffered from or is at risk of suffering from atrial tachyarrhythmia or refractory atrial tachyarrhythmia. The patient can be a patient who has suffered from or is at risk of suffering from ventricular arrhythmia, ventricular tachycardia, ventricular fibrillation, refractory ventricular arrhythmia, refractory ventricular tachycardia, or refractory ventricular fibrillation. The patient can be a patient who has suffered from or is at risk of suffering from a cardiac arrhythmia selected from the group consisting of long QT syndrome, ischemic cardiomyopathy, dilated cardiomyopathy, valvular heart disease, acute myocardial infarction, and ongoing myocardial ischemia, and combinations thereof. The patient can be a patient who has an implantable cardioverter-defibrillator (ICD). The cryogenic therapy can result in temporarily interruption of sympathetic stimulation to the cardiovascular system for up to 1, 2, 3, 4, 5, or 6 months. The cryogenic therapy can cause regeneration of the treated nerves of stellate ganglion or the autonomic tissue area peripheral to the stellate ganglion. The cryogenic therapy can cause regeneration of one or more sodium channels of the treated nerves of the stellate ganglion or the autonomic tissue area peripheral to the stellate ganglion. The one or more desired nerves of the stellate ganglion can include one or more desired nerves of the stellate ganglion. The one or more desired nerves of the stellate ganglion can include one or more desired nerves of a left stellate ganglion. The one or more desired nerves of the stellate ganglion or the autonomic tissue area peripheral to the stellate ganglion can include one or more desired nerves of the autonomic tissue area peripheral to the stellate ganglion. The one or more desired nerves of the stellate ganglion or the autonomic area peripheral to the stellate ganglion can include one or more desired nerves of a paravertebral chain. In certain embodiments, the one or more desired nerves of the paravertebral chain can include one or more desired nerves of one or more of a C7 region of the paravertebral chain, a C8 region of the paravertebral chain, a T1 region of the paravertebral chain, and a T2 region of the paravertebral chain. In certain embodiments, the one or more desired nerves of the paravertebral chain can include one or more desired nerves of the T1 region of the paravertebral chain and/or the T2 region of the paravertebral chain.

BRIEF DESCRIPTION OF THE DRAWINGS

In addition to the features described above, additional features and variations will be readily apparent from the following descriptions of the drawings and exemplary embodiments. It is to be understood that these drawings depict typical embodiments, and are not intended to be limiting in scope.

DETAILED DESCRIPTION

Figure 1A:
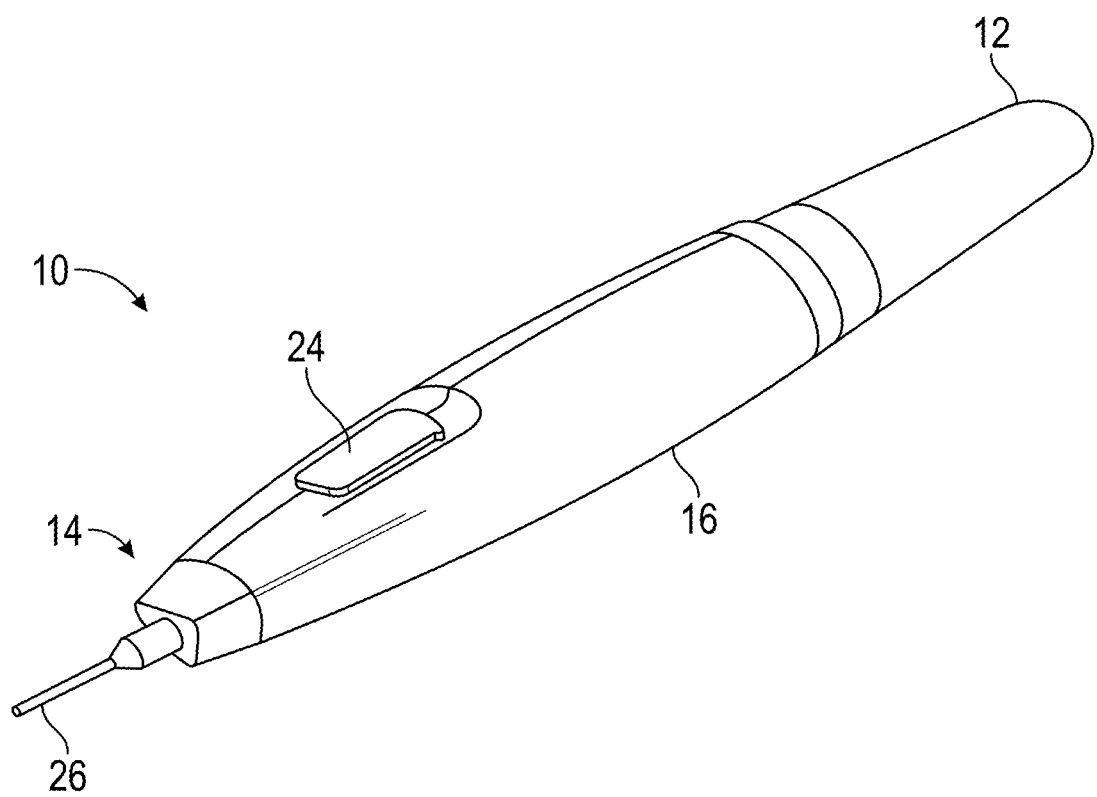
FIG. 1A is a perspective view of a self-contained cryogenic probe and system, according to some embodiments.

Embodiments of the present disclosure relate to medical devices, systems, and methods for managing heart conditions. Certain embodiments relate to medical devices, systems, and methods for treating arrhythmia. Certain embodiments relate to medical devices, systems, and methods for treating ventricular or supraventricular arrhythmia. Certain embodiments relate to medical devices, systems, and methods for treating ventricular arrhythmia, ventricular tachycardia, ventricular fibrillation, refractory ventricular arrhythmia, refractory ventricular tachycardia, or refractory ventricular fibrillation. Certain embodiments relate to medical devices, systems, and methods for treating atrial tachyarrhythmia or refractory atrial tachyarrhythmia. Certain embodiments relate to medical devices, systems, and methods for treating long QT syndrome, ischemic cardiomyopathy, dilated cardiomyopathy, valvular heart disease, acute myocardial infarction, or ongoing myocardial ischemia, or combinations thereof. Certain embodiments relate to medical devices, systems, and methods for treating cardiac electrical storm. Certain embodiments relate to medical devices, systems, and methods for treating cardiac dysrhythmia following heart surgery.

Certain embodiments employ cryogenic therapy (for example, cryoablation) to the stellate ganglion and/or autonomic tissue peripheral to the stellate ganglion to manage heart conditions (for example, arrhythmia, cardiac electrical storm, etc.). Certain embodiments employ cryogenic therapy to at least temporarily interrupt the electrical activity of certain nerves of the stellate ganglion and/or autonomic tissue peripheral to the stellate ganglion. The cryogenic therapy may block sympathetic pathways to the heart. Certain embodiments employ cryogenic therapy to the stellate ganglion and/or autonomic tissue peripheral to the stellate ganglion to perform a stellate ganglion block.

Certain embodiments include a cryogenic treatment system having a probe configured to apply a cryogenic therapy to one or more nerves, such as the nerves of the stellate ganglion and/or autonomic tissue peripheral to the stellate ganglion.

In certain embodiments, much or all of the treatment system may be included in a single hand-held apparatus. For example, a probe body in the form of a housing may contain a sealed cooling fluid cartridge having sufficient cooling fluid for treatment of a single patient. The housing may also contain a controller and battery. The housing may be sterilizable and configured for disposal so as to limit capital investment and facilitate treatments in Third-World environments. The apparatus may be wireless, cordless, and/or lack cryogenic tubes. In embodiments without cryogenic tubes, the apparatus can include an annulus or other flow restrictor to control flow rates, maintain back pressure, and/or ensure a phase shift for cryogens that are in a liquid state under pressure.

In certain embodiments, cryogenic therapy of nerves, such as the nerves of the stellate ganglion and/or autonomic tissue peripheral to the stellate ganglion, may be performed percutaneously. For example, a probe having a tip in the form of a needle may be used to pierce the skin and apply cryogenic therapy. In other embodiments, cryogenic therapy may be performed through an open procedure. In other embodiments, cryogenic therapy may be performed through an endoscopic procedure. In some embodiments, cryogenic therapy may be performed through an endoscopic procedure through the chest cavity. In some embodiments, cryogenic therapy may be performed using video-assisted thoracic surgery (VATS).

In certain embodiments, target temperatures may be selected to temporarily disable the nerves of the stellate ganglion and/or autonomic tissue peripheral to the stellate ganglion. In certain embodiments, the treatments herein may facilitate regeneration of the nerves after the nerves are temporarily disabled. In certain embodiments, the nerves may regenerate with improved anatomical structures and/or functions. For example, following regeneration, a previous heart condition of the patient (for example, arrhythmia, cardiac electrical storm, etc.) may no longer occur. For example, in certain embodiments, the nerves may regenerate with new sodium channels having improved anatomical structures and/or functions.

Embodiments of the invention may utilize a handheld refrigeration system that can use a commercially available cartridge of cooling fluid. Cooling fluids well-suited for use in handheld refrigeration systems may include nitrous oxide and carbon dioxide. These can achieve temperatures approaching −90° C.

In some embodiments, axonotmesis with Wallerian degeneration of a nerve is desired, which may be induced using treatment temperatures from about −20° C. to about −100° C. In certain embodiments, the duration of the treatment efficacy of such cryogenic treatments may be selected and controlled, with colder temperatures, longer treatment times, and/or larger volumes or selected patterns of target tissue determining the longevity of the treatment. Additional description of cryogenic cooling methods and devices may be found in commonly assigned U.S. Pat. No. 7,713,266 entitled "Subdermal Cryogenic Remodeling of Muscle, Nerves, Connective Tissue, and/or Adipose Tissue (Fat)", U.S. Pat. No. 7,850,683 entitled "Subdermal Cryogenic Remodeling of Muscles, Nerves, Connective Tissue, and/or Adipose Tissue (Fat)", U.S. Pat. No. 9,039,688 entitled "Method for Reducing Hyperdynamic Facial Wrinkles", U.S. Pat. No. 8,298,216 entitled "Pain Management Using Cryogenic Remodeling," U.S. Pat. No. 11,134,998 entitled "Integrated Cold Therapy and Electrical Stimulation Systems for Locating and Treating Nerves and Associated Methods," and U.S. Pub. No. 2018/0116705 entitled Methods and Systems for Locating and Treating Nerves with Cold Therapy," the full disclosures of which are each incorporated by reference herein.

Figure 1B:
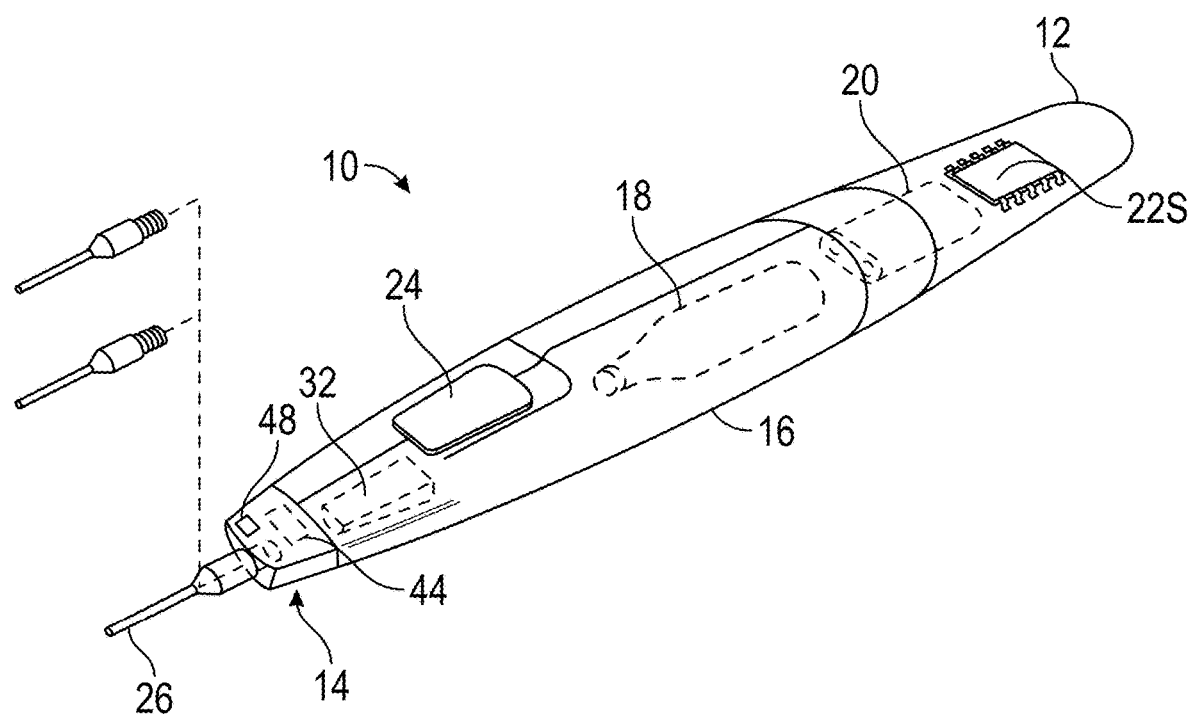
FIG. 1B is a partially transparent perspective view of the self-contained probe of FIG. 1A, showing internal components of the cryogenic system and schematically illustrating replacement treatment needles for use with the disposable probe according to some embodiments.

Referring now to FIGS. 1A and 1B, a system for cryogenic therapy includes a self-contained probe handpiece generally having a proximal end 12 and a distal end 14. A handpiece body or housing 16 has a size and ergonomic shape suitable for being grasped and supported in a surgeon's hand or other system operator. As shown in FIG. 1B, a cooling fluid supply 18, a supply valve 32, and an electrical power source 20 are found within the housing 16, along with a circuit 22S having a processor for controlling cooling applied by the self-contained system 10 in response to actuation of an input 24. Alternatively, electrical power can be applied through a cord from a remote power source. The power source 20 may also supply power to an optional heater element 44 in order to heat the proximal region of the probe 26 which may thereby help to prevent unwanted skin damage (for example, in percutaneous embodiments), and a temperature sensor 48 adjacent the proximal region of the probe 26 which helps monitor probe temperature. Additional details on the heater 44 and temperature sensor 48 are described in greater detail below. When actuated, the supply valve 32 controls the flow of cooling fluid from the fluid supply 18. Some embodiments may, at least in part, be manually activated, such as through the use of a manual supply valve and/or the like, so that processors, electrical power supplies, and the like may not be required.

Extending distally from the distal end 14 of the housing 16 may be a cryogenic cooling probe 26. In certain embodiments, the probe 26 can be a tissue-penetrating cryogenic cooling probe. The probe 26 is thermally coupled to a cooling fluid path extending from cooling fluid source 18, with the exemplary probe including a tubular body receiving at least a portion of the cooling fluid from the cooling fluid source therein. The probe 26 may include a 30 G needle or smaller gauge (e.g., 27 G) having a sharpened distal end that is axially sealed. The probe 26 may have an axial length between distal end 14 of housing 16 and the distal end of the needle of between about 0.5 mm and 15 cm. Such needles may include a stainless steel tube with an inner diameter of about 0.006 inches and an outer diameter of about 0.012 inches, while alternative probes may include structures having outer diameters (or other lateral cross-sectional dimensions) from about 0.006 inches to about 0.100 inches. In certain embodiments, the needle probe 26 may include a 16 G or smaller diameter needle, a 20 G needle or smaller, or a 22, 25, 26, 27, 28, 29, or 30 G or smaller diameter needle.

In some embodiments, the probe 26 may include two or more needles arranged in a linear array, such as those disclosed in previously incorporated U.S. Pat. No. 7,850,683. Another exemplary embodiment of a probe having multiple needle probe configurations allow the cryogenic treatment to be applied to a larger or more specific treatment area. Other needle configurations that facilitate controlling the depth of needle penetration and insulated needle embodiments are disclosed in commonly assigned U.S. Pat. No. 8,409,185 entitled "Replaceable and/or Easily Removable Needle Systems for Dermal and Transdermal Cryogenic Remodeling," the entire content of which is incorporated herein by reference. Multiple needle arrays may also be arrayed in alternative configurations such as a triangular or square array.

Arrays may be designed to treat a particular region of tissue, or to provide a uniform treatment within a particular region, or both. In some embodiments the needle 26 may be releasably coupled with the body 16 so that it may be replaced after use with a sharper needle (as indicated by the dotted line) or with a needle having a different configuration. In exemplary embodiments, the needle may be threaded into the body, press fit into an aperture in the body or have a quick disconnect such as a detent mechanism for engaging the needle with the body. A quick disconnect with a check valve may be advantageous since it may permit decoupling of the needle from the body at any time without excessive cooling fluid discharge. This can be a useful safety feature in the event that the device fails in operation (e.g. valve failure), allowing an operator to disengage the needle and device from a patient's tissue without exposing the patient to cooling fluid as the system depressurizes. This feature may also be advantageous because it allows an operator to easily exchange a dull needle with a sharp needle in the middle of a treatment. One of skill in the art will appreciate that other coupling mechanisms may be used.

Addressing some of the components within the housing 16, the exemplary cooling fluid supply 18 may include a canister, sometimes referred to herein as a cartridge, containing a liquid under pressure. with the liquid preferably having a boiling temperature of less than 37° C. at one atmosphere of pressure. When the fluid is thermally coupled to the probe 26, and the probe is positioned within the patient so that an outer surface of the probe is adjacent to a target tissue, the heat from the target tissue evaporates at least a portion of the liquid and the enthalpy of vaporization cools the target tissue. A supply valve 32 may be disposed along the cooling fluid flow path between canister 18 and probe 26, or along the cooling fluid flow path after the probe so as to limit cooling fluid flow thereby regulating the temperature, treatment time, rate of temperature change, or other cooling characteristics. The valve can be powered electrically via the power source 20, per the direction of the processor 22, but may at least in part be manually powered. The exemplary power source 20 includes a rechargeable or single-use battery. Additional details about the valve 32 are disclosed below and further disclosure on the power source 20 may be found in commonly assigned Int'l Pub. No. WO 2010/075438 entitled "Integrated Cryosurgical Probe Package with Fluid Reservoir and Limited Electrical Power Source," the entire contents of which are incorporated herein by reference.

The cooling fluid supply 18 may include a single-use canister. Advantageously, the canister and cooling fluid therein may be stored and/or used at (or even above) room temperature. The canister may have a frangible seal or may be refillable, with the exemplary canister containing liquid nitrous oxide, $N_2O$. A variety of alternative cooling fluids might also be used, with exemplary cooling fluids including fluorocarbon cooling fluid and/or carbon dioxide. The quantity of cooling fluid contained by the canister 18 can be sufficient to treat at least a significant region of a patient (such as the stellate ganglion and/or autonomic tissue peripheral to the stellate ganglion), but can be less than sufficient two or more significant regions of a patient and/or to treat two or more patients. An exemplary liquid $N_2O$ canister might contain, for example, a quantity in a range from about 1 gram to about 40 grams of liquid, from about 1 gram to about 35 grams of liquid, or from about 7 grams to about 30 grams of liquid.

The processor or controller 22 can include a programmable electronic microprocessor embodying machine readable computer code or programming instructions for implementing one or more of the treatment methods described herein. The microprocessor can include or be coupled to a memory (such as a non-volatile memory, a flash memory, a read-only memory ("ROM"), a random access memory ("RAM"), or the like) storing the computer code and data to be used thereby, and/or a recording media (including a solid state recording media such as a flash memory drive; a magnetic recording media such as a hard disk, a floppy disk, or the like; or an optical recording media such as a CD or DVD) may be provided. Suitable interface devices (such as digital-to-analog or analog-to-digital converters, or the like) and input/output devices (such as USB or serial I/O ports, wireless communication cards, graphical display cards, and the like) may also be provided. A wide variety of commercially available or specialized processor structures may be used in different embodiments, and suitable processors may make use of a wide variety of combinations of hardware and/or hardware/software combinations. For example, the processor 22 may be integrated on a single processor board and may run a single program or may make use of a plurality of boards running a number of different program modules in a wide variety of alternative distributed data processing or code architectures.

Figure 2A:
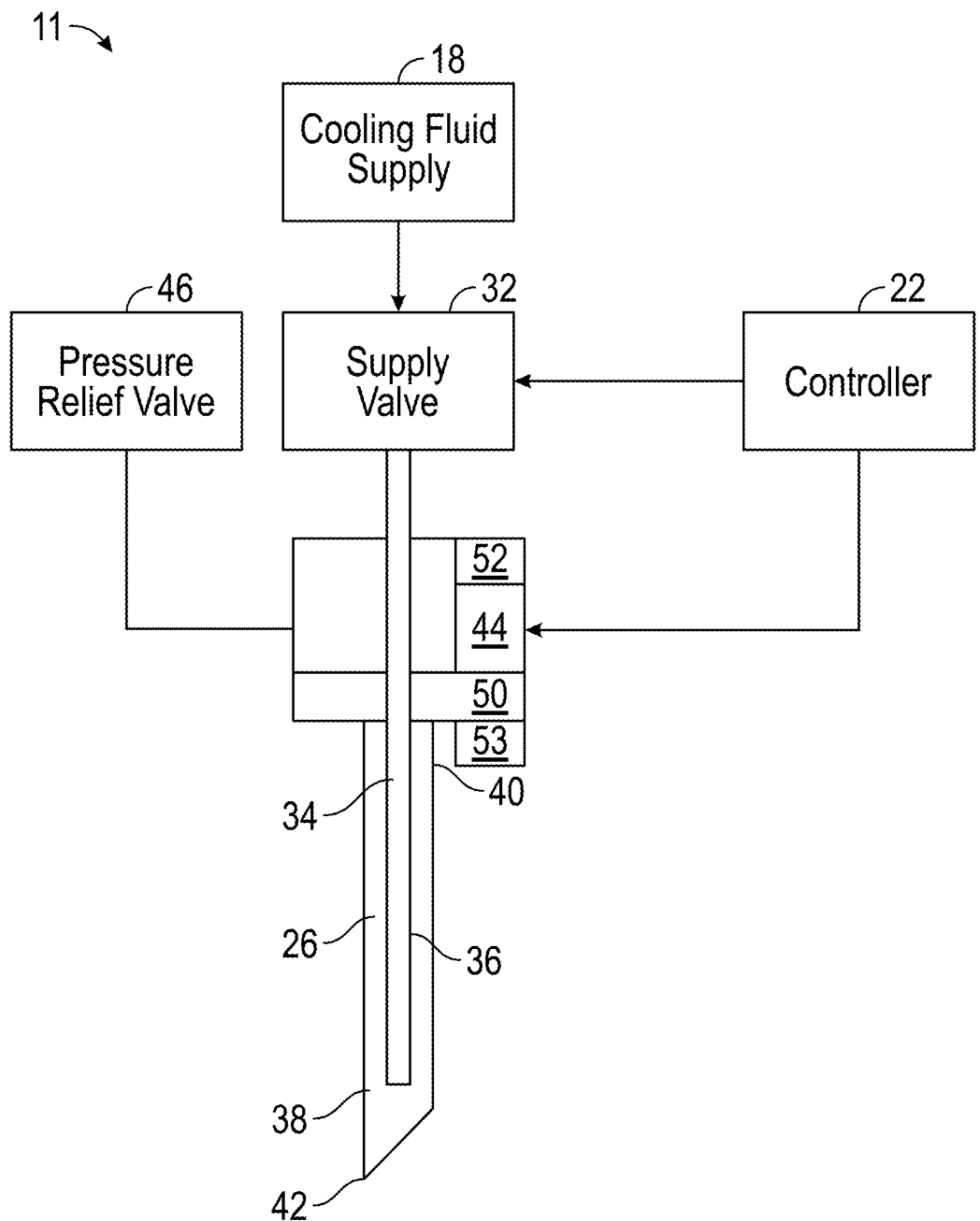
FIG. 2A schematically illustrates exemplary components that may be included in the treatment system.

Referring now to FIG. 2A, a schematic 11 shows a simplified diagram of cooling fluid flow and control. The flow of cooling fluid from the fluid supply 18 may be controlled by a supply valve 32. The supply valve 32 may include an electrically actuated solenoid valve, a motor actuated valve or the like operating in response to control signals from the controller 22, and/or may include a manual valve. Exemplary supply valves may include structures suitable for on/off valve operation, and may provide venting of the fluid source and/or the cooling fluid path downstream of the valve when cooling flow is halted so as to limit residual cryogenic fluid vaporization and cooling. Additionally, the valve may be actuated by the controller in order to modulate cooling fluid flow to provide high rates of cooling in some instances where it is desirable to promote necrosis of tissue such as in malignant lesions and the like or slow cooling which promotes ice formation between cells rather than within cells when necrosis is not desired. More complex flow modulating valve structures might also be used in other embodiments. For example, other applicable valve embodiments are disclosed in previously incorporated U.S. Pat. No. 8,409,185.

Still referring to FIG. 2A, an optional heater (not illustrated) may be used to heat the cooling fluid supply 18 so that heated cooling fluid flows through the valve 32 and through a lumen 34 of a cooling fluid supply tube 36. In some embodiments a safety mechanism can be included so that the cooling supply is not overheated. Examples of such embodiments are disclosed in commonly assigned International Publication No. WO 2010075438, the entirety of which is incorporated by reference herein.

The supply tube 36 is, at least in part, disposed within a lumen 38 of the needle 26, with the supply tube extending distally from a proximal end 40 of the needle toward a distal end 42. The exemplary supply tube 36 includes a fused silica tubular structure (not illustrated) having a polymer coating and extending in cantilever into the needle lumen 38. The supply tube 36 may have an inner lumen with an effective inner diameter of less than about 200 µm, less than about 100 µm, or less than about 70 µm. Exemplary embodiments of the supply tube 36 have inner lumens of between about 15 and 70 µm, such as about 30 µm or 65 µm. An outer diameter or size of the supply tube 36 can be less than about 1000 µm or less than about 800 µm, with exemplary embodiments being between about 60 and 150 µm, such as about 90 µm or 105 µm. The tolerance of the inner lumen diameter of supply tubing 36 can be relatively tight, for example, being about +/−10 µm or tighter, +/−5 µm or tighter, or +/−3 µm or tighter (e.g., +/−1 µm), as the small diameter supply tube may provide the majority of (or even substantially all of) the metering of the cooling fluid flow into needle 26. Additional details on various aspects of needle 26 along with alternative embodiments and principles of operation are disclosed in greater detail in U.S. Pat. No. 9,254,162 entitled "Dermal and Transdermal Cryogenic Microprobe Systems and Methods," the entire contents of which are incorporated herein by reference. Previously incorporated U.S. Pat. No. 8,409,185 also discloses additional details on the needle 26 along with various alternative embodiments and principles of operation.

The cooling fluid injected into the lumen 38 of the needle 26 can include liquid, though some gas may also be injected. At least some of the liquid vaporizes within the needle 26, and the enthalpy of vaporization cools the needle and also the surrounding tissue engaged by the needle. An optional heater 44 (illustrated in FIG. 1B) may be used to heat the proximal region of the needle in order to prevent unwanted skin damage in this area (for example, in percutaneous embodiments). Controlling a pressure of the gas/liquid mixture within the needle 26 substantially controls the temperature within the lumen 38, and hence the treatment temperature range of the tissue. A mechanical pressure relief valve 46 may be used to control the pressure within the lumen of the needle, with the exemplary valve including a valve body such as a ball bearing, urged against a valve seat by a biasing spring. The relief valve may allow better temperature control in the needle, minimizing transient temperatures. Further details on exhaust volume are disclosed in previously incorporated U.S. Pat. No. 8,409,185.

The heater 44 may be thermally coupled to a thermally responsive element 50, which is supplied with power by the controller 22 and thermally coupled to a proximal portion of the needle 26. The thermally responsive element 50 can be a block constructed from a material of high thermal conductivity and low heat capacity, such as aluminum. A first temperature sensor 52 (e.g., thermistor, resistance temperature detectors, or thermocouple) can also be thermally coupled to the thermally responsive element 50 and communicatively coupled to the controller 22. A second temperature sensor 53 can also be positioned near the heater 44, for example, such that the first temperature sensor 52 and second temperature sensor 53 are placed in different positions within the thermally responsive element 50. In some embodiments, the second temperature sensor 53 is placed closer to a tissue contacting surface than the first temperature sensor 52 is placed in order to provide comparative data (e.g., temperature differential) between the sensors 52, 53. The controller 22 can be configured to receive temperature information of the thermally responsive element 50 via the temperature sensor 52 in order to provide the heater 44 with enough power to maintain the thermally responsive element 50 at a particular temperature.

The controller 22 can be further configured to monitor power draw from the heater 44 in order to characterize tissue type, perform device diagnostics, and/or provide feedback for a tissue treatment algorithm. This can be advantageous over monitoring temperature alone, since power draw from the heater 44 can vary greatly while temperature of the thermally responsive element 50 remains relatively stable. For example, during treatment of target tissue, maintaining the thermally responsive element 50 at 40° C. during a cooling cycle may take 1.0 W initially (for a needle <10 mm in length) and is normally expected to climb to 1.5 W after 20 seconds, due to the needle 26 drawing in surrounding heat. An indication that the heater is drawing 2.0 W after 20 seconds to maintain 40° C. can indicate that an aspect of the system 10 is malfunctioning and/or that the needle 26 is incorrectly positioned. Correlations with power draw and correlated device and/or tissue conditions can be determined experimentally to determine acceptable treatment power ranges.

In some embodiments, it may be preferable to limit frozen tissue that is not at the treatment temperature, i.e., to limit the size of a formed cooling zone within tissue. Such cooling zones may be associated with a particular physical reaction, such as the formation of an ice-ball, or with a particular temperature profile or temperature volume gradient required to therapeutically affect the tissue therein. To achieve this, metering cooling fluid flow could maintain a large thermal gradient at its outside edges. This may be particularly advantageous in applications for creating an array of connected cooling zones (i.e., fence) in a treatment zone, as time would be provided for the treatment zone to fully develop within the fenced in portion of the tissue, while the outer boundaries maintained a relatively large thermal gradient due to the repeated application and removal of refrigeration power. This could provide a mechanism within the body of tissue to thermally regulate the treatment zone and could provide increased ability to modulate the treatment zone at a prescribed distance from the surface of the skin. A related treatment algorithm could be predefined, or it could be in response to feedback from the tissue.

Such feedback could be temperature measurements from the needle 26, or the temperature of the surface of the skin could be measured in percutaneous applications. However, in many cases monitoring temperature at the needle 26 is impractical due to size constraints. To overcome this, operating performance of the sensorless needle 26 can be interpolated by measuring characteristics of thermally-coupled elements, such as the thermally responsive element 50.

Additional methods of monitoring cooling and maintaining an unfrozen portion of the needle include the addition of a heating element and/or monitoring element into the needle itself. This could consist of a small thermistor or thermocouple, and a wire that could provide resistive heat. Other power sources could also be applied such as infrared light, radiofrequency heat, and ultrasound. These systems could also be applied together dependent upon the control of the treatment zone desired.

Alternative methods to inhibit excessively low transient temperatures at the beginning of a refrigeration cycle might be employed instead of or together with the limiting of the exhaust volume. For example, the supply valve 32 might be cycled on and off, typically by controller 22, with a timing sequence that would limit the cooling fluid flowing so that only vaporized gas reached the needle lumen 38 (or a sufficiently limited amount of liquid to avoid excessive dropping of the needle lumen temperature). This cycling might be ended once the exhaust volume pressure was sufficient so that the refrigeration temperature would be within desired limits during steady state flow. Analytical models that may be used to estimate cooling flows are described in greater detail in previously incorporated U.S. Pat. No. 9,254,162.

Figure 2B:
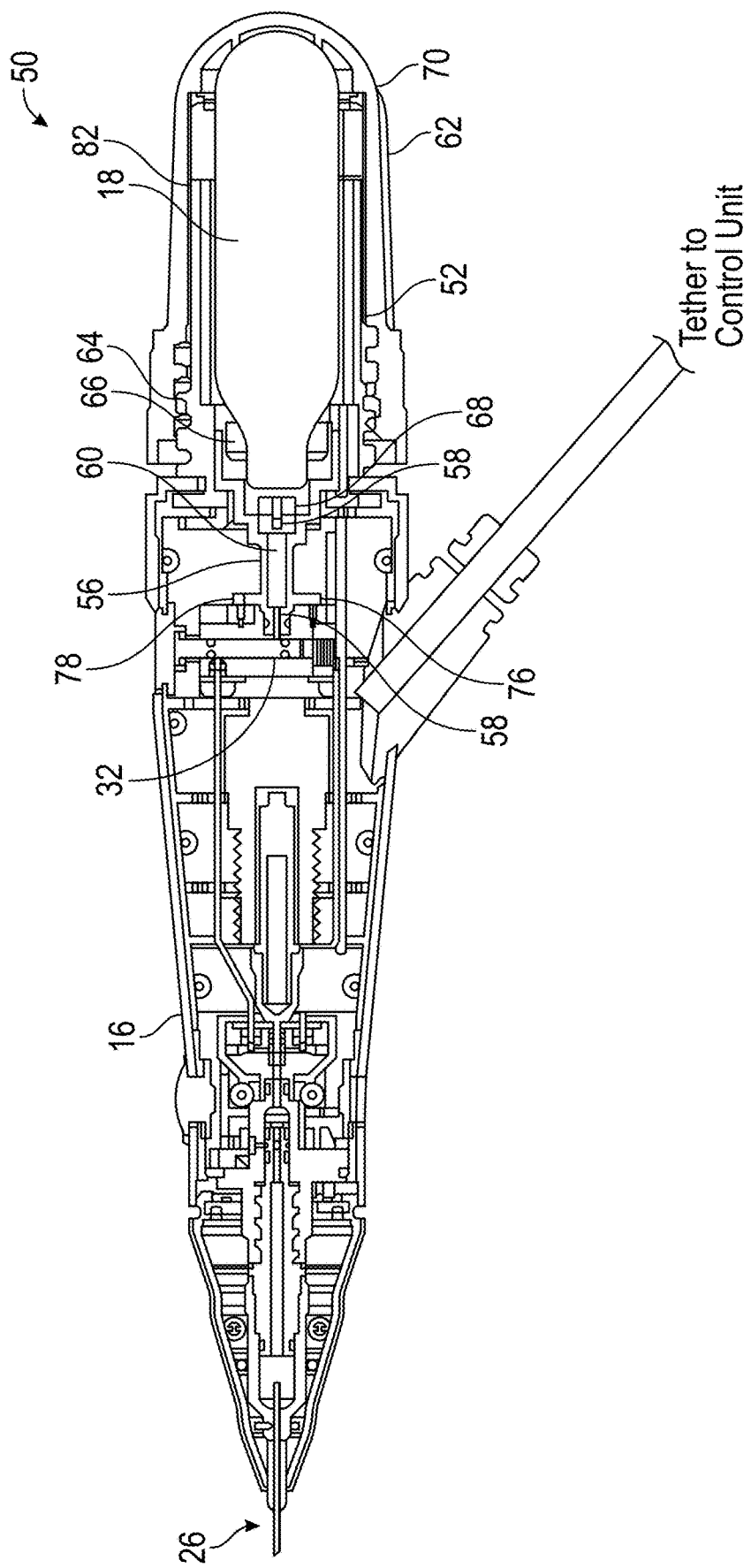
FIG. 2B is a cross-sectional view of the system of FIG. 1A, according to some embodiments.

FIG. 2B shows a cross-section of the housing 16. This embodiment of the housing 16 may be powered by an external source, hence the attached cable, but could alternatively include a portable power source. As shown, the housing includes a cartridge holder 50. The cartridge holder 50 includes a cartridge receiver 52, which may be configured to hold a pressured cooling fluid cartridge 18. The cartridge receiver 52 includes an elongated cylindrical passage 70, which is dimensioned to hold a commercially available cooling fluid cartridge 18. A distal portion of the cartridge receiver 52 includes a filter device 56, which has an elongated conical shape. In some embodiments, the cartridge holder 50 may be largely integrated into the housing 16 as shown, however, in alternative embodiments, the cartridge holder 50 is a wholly separate assembly, which may be pre-provided with a cooling fluid source 18.

The filter device 56 may fluidly couple the cooling fluid source (cartridge) 18 at a proximal end to the valve 32 at a distal end. The filter device 56 may include at least one particulate filter 58. In the shown embodiment, a particulate filter 58 at each proximal and distal end of the filter device 56 may be included. The particulate filter 58 can be configured to prevent particles of a certain size from passing through. For example, the particulate filter 58 can be constructed as a microscreen having a plurality of passages less than 2 microns in width, and thus particles greater than 2 microns would not be able to pass.

The filter device 56 also includes a molecular filter 60 that is configured to capture fluid impurities. In some embodiments, the molecular filter 60 is a plurality of filter media (e.g., pellets, powder, particles) configured to trap molecules of a certain size. For example, the filter media can include molecular sieves having pores ranging from 1-20 Å. In another example, the pores have an average size of 5 Å. The molecular filter 60 can have two modalities. In a first mode, the molecular filter 60 will filter fluid impurities received from the cartridge 18. However, in another mode, the molecular filter 60 can capture impurities within the valve 32 and fluid supply tube 36 when the system 10 is not in use, i.e., when the cartridge 18 is not fluidly connected to the valve 32.

Alternatively, the filter device 56 can be constructed primarily from ePTFE (such as a Gore-Tex® material), sintered polyethylene (such as made by POREX), or metal mesh. The pore size and filter thickness can be optimized to minimize pressure drop while capturing the majority of contaminants. These various materials can be treated to make it hydrophobic (e.g., by a plasma treatment) and/or oleophobic so as to repel water or hydrocarbon contaminants.

It has been found that in some instances fluid impurities may leach out from various aspects of the system 10. These impurities can include trapped moisture in the form of water molecules and chemical gasses. The presence of these impurities is believed to hamper cooling performance of the system 10. The filter device 56 can act as a desiccant that attracts and traps moisture within the system 10, as well as chemicals out gassed from various aspects of the system 10. Alternately the various aspects of the system 10 can be coated or plated with impermeable materials such as a metal.

Figure 2C:
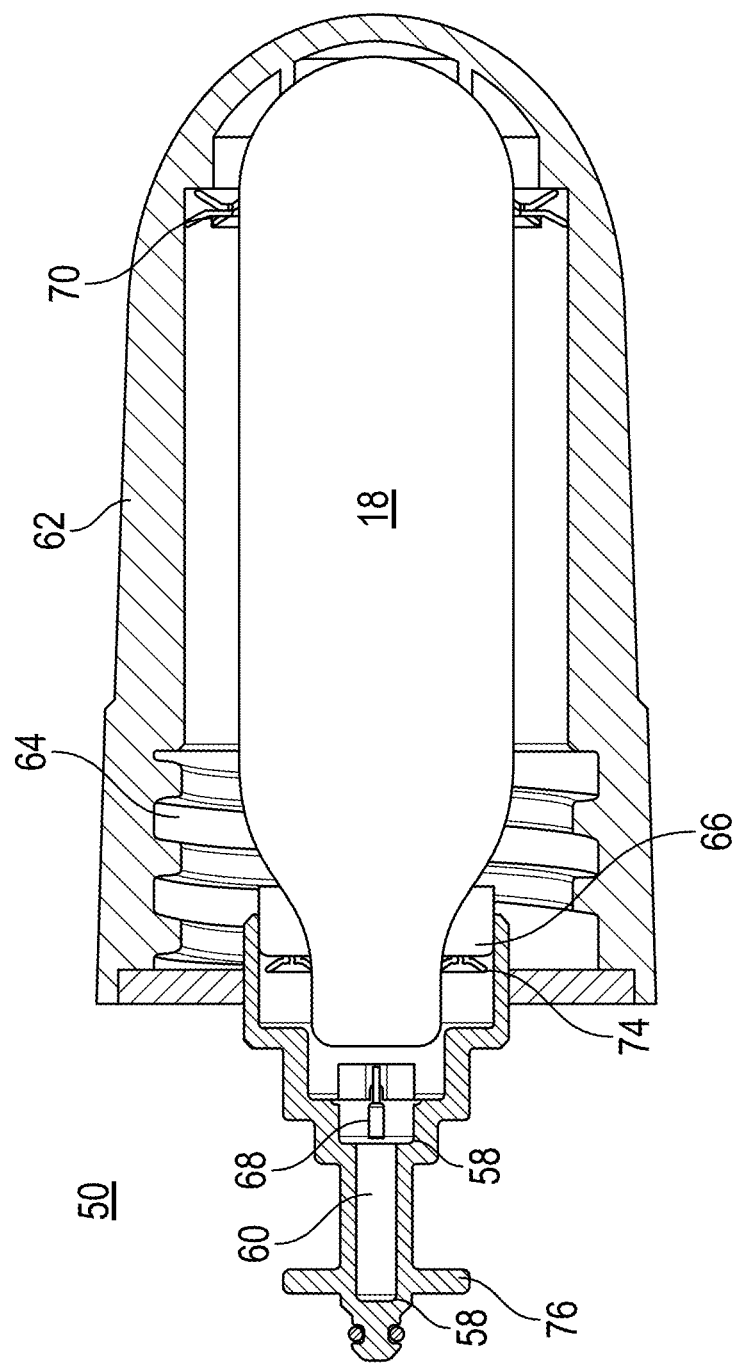
FIGS. 2C and 2D are cross-sectional views showing exemplary operational configurations of a portion of the system of FIG. 2B.
Figure 2D:
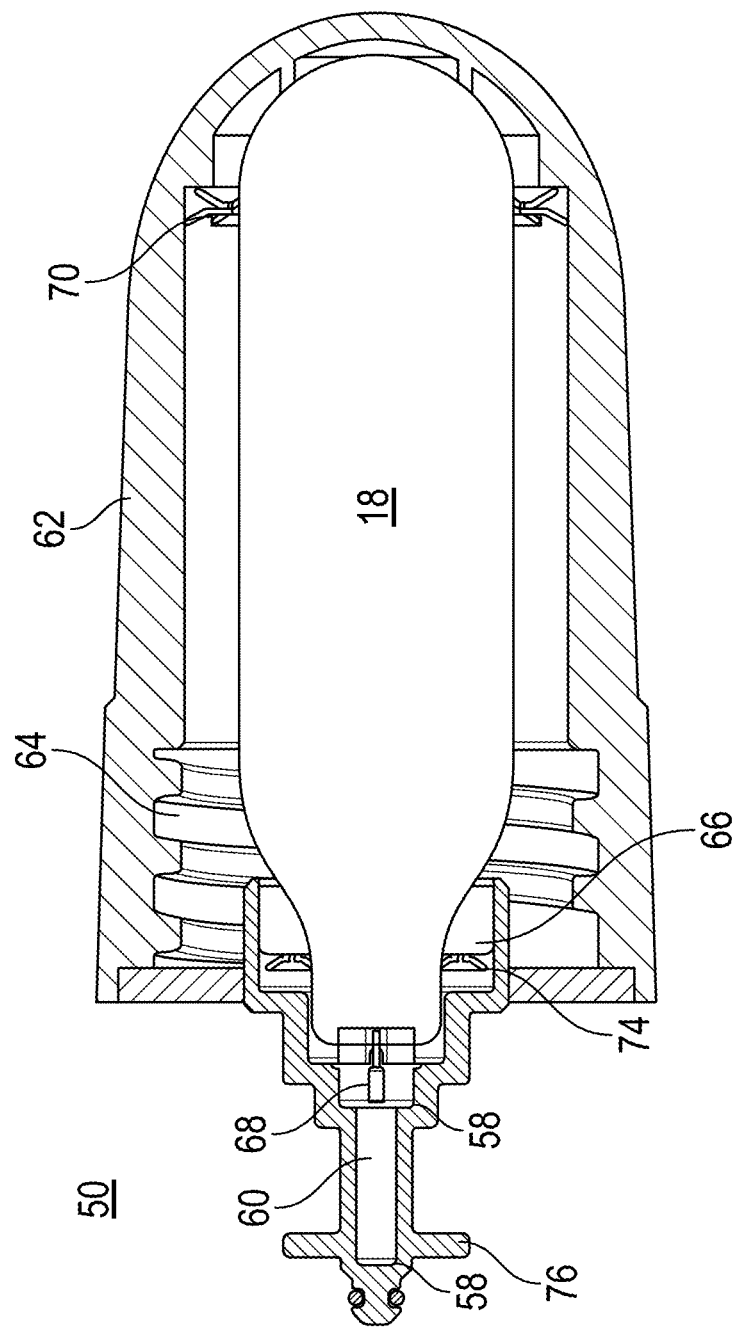

As shown in FIG. 2B and in more detail in FIG. 2C and FIG. 2D, the cartridge 18 can be held by the cartridge receiver 52 such that the cartridge 18 remains intact and unpunctured. In this inactive mode, the cartridge may not be fluidly connected to the valve 32. A removable cartridge cover 62 can be attached to the cartridge receiver 52 such that the inactive mode is maintained while the cartridge is held by the system 10.

In use, the cartridge cover 62 can be removed and supplied with a cartridge containing a cooling fluid. The cartridge cover 62 can then be reattached to the cartridge receiver 52 by turning the cartridge cover 62 until female threads 64 of the cartridge cover 62 engage with male threads of the cartridge receiver 52. The cartridge cover 62 can be turned until resilient force is felt from an elastic seal 66, as shown in FIG. 2C. To place the system 10 into use, the cartridge cover 62 can be further turned until the distal tip of the cartridge 18 is punctured by a puncture pin connector 68, as shown in FIG. 2D. Once the cartridge 18 is punctured, cooling fluid may escape the cartridge by flowing through the filter device 56, where the impurities within the cooling fluid may be captured. The purified cooling fluid then passes to the valve 32, and onto the cooling fluid supply tube 36 to cool the probe 26. In some embodiments the filter device, or portions thereof, may be replaceable.

In some embodiments, the puncture pin connector 68 can have a two-way valve (e.g., ball/seat and spring) that is closed unless connected to the cartridge. Alternately, pressure can be used to open the valve. The valve closes when the cartridge is removed. In some embodiments, there may be a relief valve piloted by a spring which is balanced by high-pressure nitrous when the cartridge is installed and the system is pressurized, but allows the high-pressure cooling fluid to vent when the cooling fluid is removed. In addition, the design can include a vent port that vents cold cooling fluid away from the cartridge port. Cold venting cooling fluid locally can cause condensation in the form of liquid water to form from the surrounding environment. Liquid water or water vapor entering the system can hamper the cryogenic performance. Further, fluid carrying portions of the cartridge receiver 52 can be treated (e.g., plasma treatment) to become hydrophobic and/or oleophobic so as to repel water or hydrocarbon contaminants.

Figure 3A:
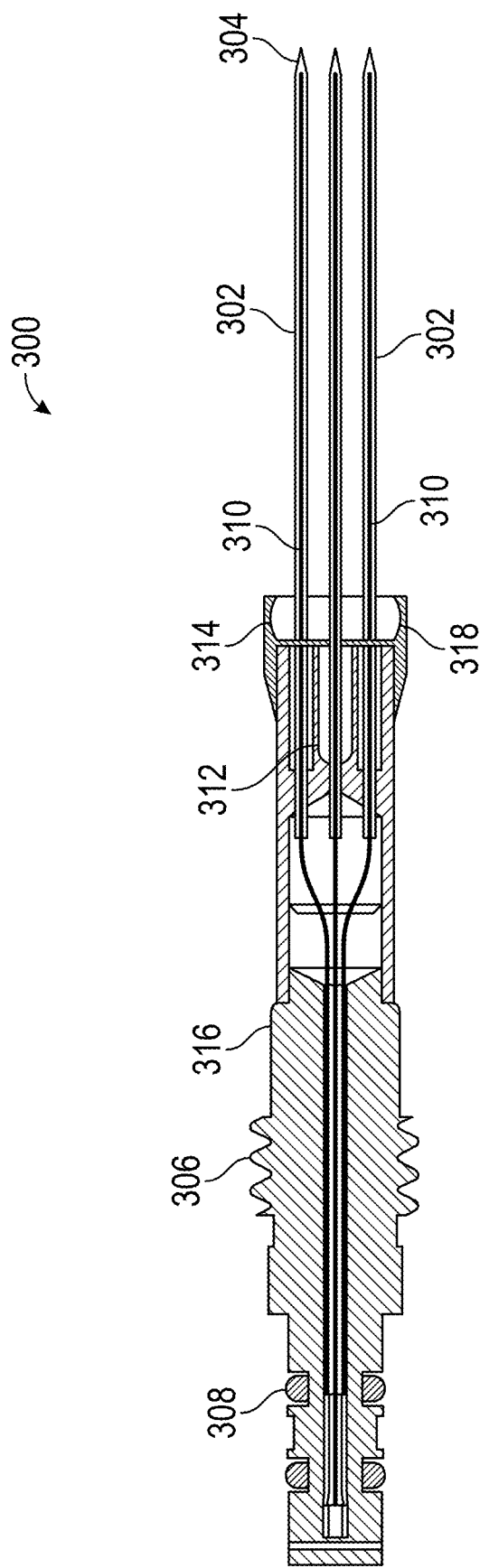
FIGS. 3A-3D illustrate exemplary embodiments of needle probes, according to some embodiments.
Figure 3B:
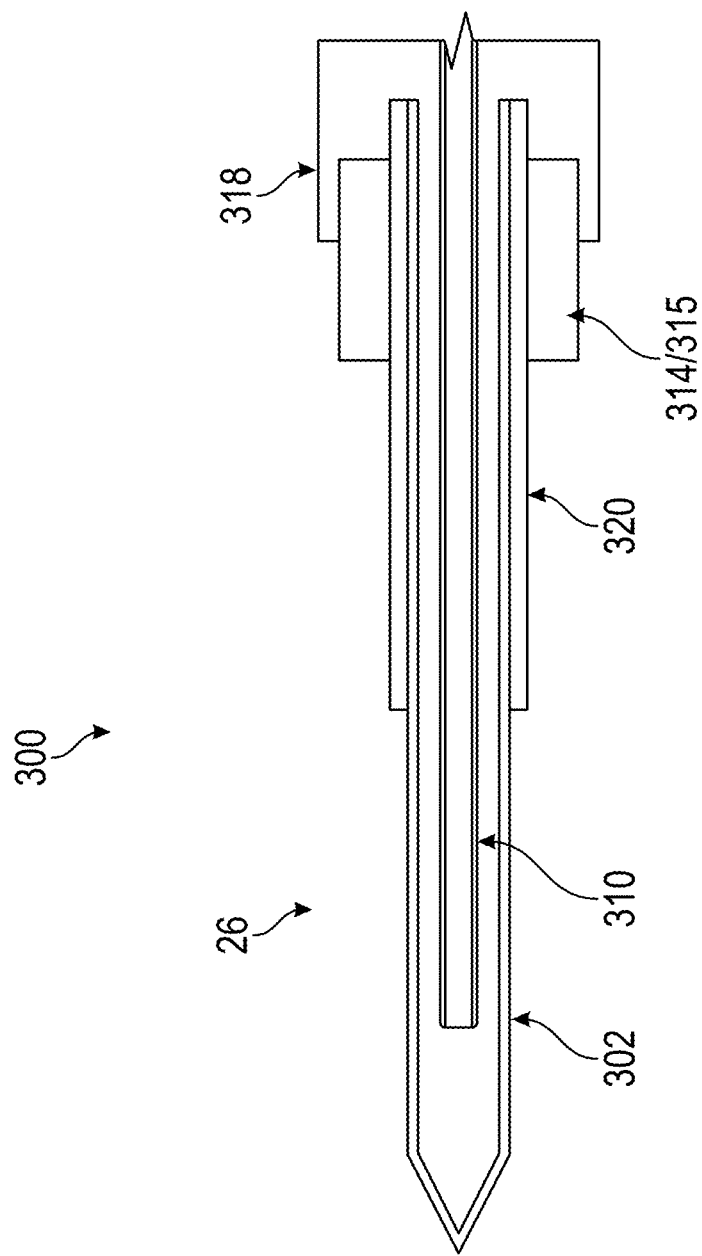

Turning now to FIG. 3A and FIG. 3B, an exemplary embodiment of a probe 300 having multiple needles 302 is described. In FIG. 3A, the probe housing 316 includes threads 306 that allow the probe to be threadably engaged with the housing 16 of a cryogenic device. O-rings 308 fluidly seal the probe housing 316 with the device housing 16 and prevent cooling fluid from leaking around the interface between the two components. The probe 300 includes an array of three distally extending needle shafts 302, each having a sharpened, tissue penetrating tip 304. In certain embodiments, using three linearly arranged needles allows a greater area of tissue to be treated as compared with a single needle. In use, cooling fluid flows through the lumens 310 into the needle shafts 302 thereby cooling the needle shafts 302. Ideally, only the distal portion of the needle shaft 302 would be cooled so that only the target tissue receives the cryogenic treatment. However, as the cooling fluid flows through the probe 300, probe temperature decreases proximally along the length of the needle shafts 302 towards the probe hub 318. The proximal portion of needle shaft 302 and the probe hub 318 contact skin in certain embodiments and may become very cold (e.g. −20° C. to −25° C.) and this can damage the skin in the form of blistering or loss of skin pigmentation. Therefore, it may be desirable to ensure that the proximal portion of needle shaft 302 and hub 318 remains warmer than the distal portion of needle shaft 302. A proposed solution to this challenge is to include a heater element 314 that can heat the proximal portion of needle shaft 302 and an optional temperature sensor 312 to monitor temperature in this region. To further this, a proximal portion of the needle shaft 302 can be coated with a highly thermally conductive material, e.g., gold, that is conductively coupled to both the needle shaft 302 and the heater element 314. Details of this construction are disclosed below.

In the exemplary embodiment of FIG. 3A, heater element 314 is disposed near the needle hub 318 and near a proximal region of needle shaft 302. The effective resistance of the heater element can be 1Ω to 1K Ω, or from 3Ω to 50Ω. Additionally, a temperature sensor 312 such as a thermistor or thermocouple is also disposed in the same vicinity. Thus, during a treatment as the needles cool down, the heater 314 may be turned on in order to heat the hub 318 and proximal region of needle shaft 302, thereby preventing this portion of the device from cooling down as much as the remainder of the needle shaft 302. The temperature sensor 312 may provide feedback to controller 22 and a feedback loop can be used to control the heater 314. The cooling power of the nitrous oxide may eventually overcome the effects of the heater, therefore the microprocessor may also be programmed with a warning light and/or an automatic shutoff time to stop the cooling treatment before skin damage occurs. An added benefit of using such a heater element is the fact that the heat helps to moderate the flow of cooling fluid into the needle shaft 302 helping to provide more uniform cooling fluid mass flow to the needles shaft 302 with more uniform cooling resulting.

The embodiment of FIG. 3A illustrates a heater fixed to the probe hub. In other embodiments, the heater may float, thereby ensuring proper skin contact and proper heat transfer to the skin. Examples of floating heaters are disclosed in commonly assigned Int'l Pub. No. WO 2010/075448 entitled "Skin Protection for Subdermal Cryogenic Remodeling for Cosmetic and Other Treatments," the entirety of which is incorporated by reference herein.

In this exemplary embodiment, three needles are illustrated. One of skill in the art will appreciate that a single needle may be used, as well as two, four, five, six, or more needles may be used. When a plurality of needles are used, they may be arranged in any number of patterns. For example, a single linear array may be used, or a two dimensional or three dimensional array may be used. Examples of two dimensional arrays include any number of rows and columns of needles (e.g. a rectangular array, a square array, elliptical, circular, triangular, etc.), and examples of three dimensional arrays include those where the needle tips are at different distances from the probe hub, such as in an inverted pyramid shape.

FIG. 3B illustrates a cross-section of the needle shaft 302 of needle probe 300. The needle shaft can be conductively coupled (e.g., welded, conductively bonded, press fit) to a conductive heater 314 to enable heat transfer therebetween. The needle shaft 302 is generally a small (e.g., 20-30 gauge) closed tip hollow needle, which can be between about 0.2 mm and 15 cm, preferably having a length from about 0.3 cm to about 10 cm. The conductive heater element 314 can be housed within a conductive block 315 of high thermally conductive material, such as aluminum and include an electrically insulated coating, such as Type III anodized coating to electrically insulate it without diminishing its heat transfer properties. The conductive block 315 can be heated by a resistor or other heating element (e.g. cartridge heater, nichrome wire, semiconductor device, etc.) bonded thereto with a heat conductive adhesive, such as epoxy. A thermistor can be coupled to the conductive block 315 with heat-conductive epoxy or other thermally conductive means to allow for temperature monitoring. Other temperature sensors may also be used, such as a thermocouple or resistance temperature detectors.

An optional cladding 320 of conductive material may be conductively coupled to the proximal portion of the shaft of the needle 302, which can be stainless steel. In some embodiments, the cladding 320 is a layer of gold, or alloys thereof, coated on the exterior of the proximal portion of the needle shaft 302. In some embodiments, the exposed length of cladding 320 on the proximal portion of the needle is 2-100 mm. In some embodiments, the cladding 320 can be of a thickness such that the clad portion has a diameter ranging from 0.017-0.020 in., and in some embodiments 0.0182 in. Accordingly, the cladding 320 can be conductively coupled to the material of the needle 302, which can be less conductive, than the cladding 320. The cladding 320 may modify the lateral force required to deflect or bend the needle 26. Cladding 320 may be used to provide a stiffer needle shaft along the proximal end in order to more easily transfer force to the leading tip during placement and allow the distal portion of the needle to deflect more easily when it is dissecting a tissue interface within the body. The stiffness of needle 26 can vary from one end to the other end by other means such as material selection, metal tempering, variation of the inner diameter of the needle 26, or segments of needle shaft joined together end-to-end to form one contiguous needle 26. In some embodiments, increasing the stiffness of the distal portion of the needle 26 can be used to flex the proximal portion of the needle to access difficult treatment sites.

In some embodiments, the cladding 320 can include sub-coatings (e.g., nickel) that promote adhesion of an outer coating that would otherwise not bond well to the needle shaft 302. Other highly conductive materials can be used as well, such as copper, silver, aluminum, and alloys thereof. In some embodiments, a protective polymer or metal coating can cover the cladding to promote biocompatibility of an otherwise non-biocompatible but highly conductive cladding material. Such a biocompatible coating however, would be applied to not disrupt conductivity between the conductive block 315. In some embodiments, an insulating layer, such as a ceramic material, is coated over the cladding 320, which remains conductively coupled to the needle shaft 302.

In use, the cladding 320 can transfer heat to the proximal portion of the needle 302 to prevent directly surrounding tissue from dropping to cryogenic temperatures. Protection can be derived from heating the non-targeting tissue during a cooling procedure, and in some embodiments before the procedure as well. The mechanism of protection may be providing heat to pressurized cooling fluid passing within the proximal portion of the needle to affect complete vaporization of the fluid. Thus, the non-target tissue in contact with the proximal portion of the needle shaft 302 does not need to supply heat, as opposed to target tissue in contact with the distal region of the needle shaft 302. To help further this effect, in some embodiments the cladding 320 is coating within the interior of the distal portion of the needle, with or without an exterior cladding. To additionally help further this effect, in some embodiments, the distal portion of the needle can be thermally isolated from the proximal portion by a junction, such as a ceramic junction. While in some further embodiments, the entirety of the proximal portion is constructed from a more conductive material than the distal portion.

In use, it has been determined experimentally that the cladding 320 can help limit formation of a cooling zone to the distal portion of the needle shaft 302, which tends to demarcate at a distal end of the cladding 320. Accordingly, cooling zones are formed only about the distal portions of the needles. Thus, non-target tissue in direct contact with proximal needle shafts remain protected from effects of cryogenic temperatures. Such effects can include discoloration and blistering of the skin (for example, in percutaneous embodiments). Such cooling zones may be associated with a particular physical reaction, such as the formation of an ice-ball, or with a particular temperature required to therapeutically affect the tissue therein.

Standard stainless steel needles and gold clad steel needles were tested in porcine muscle and fat. Temperatures were measured 2 mm from the proximal end of the needle shafts, about where the cladding distally terminates, and at the distal tip of the needles. Temperatures for clad needles were dramatically warmer at the 2 mm point versus the unclad needles, and did not drop below 4° C. The 2 mm points of the standard stainless steel needles almost equalize in temperature with the distal tip at temperatures below 0° C.

Figure 3C:
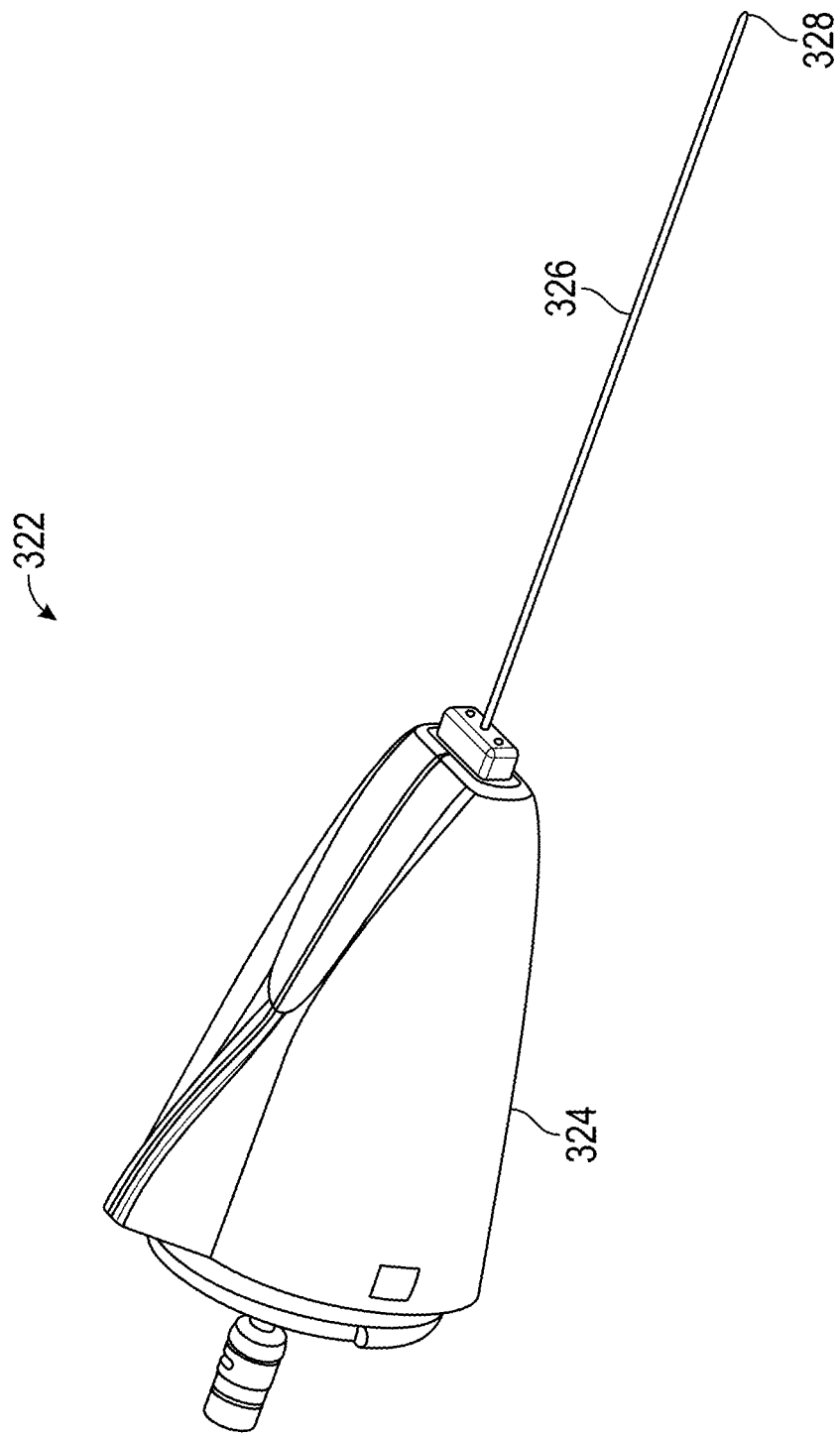
Figure 3D:
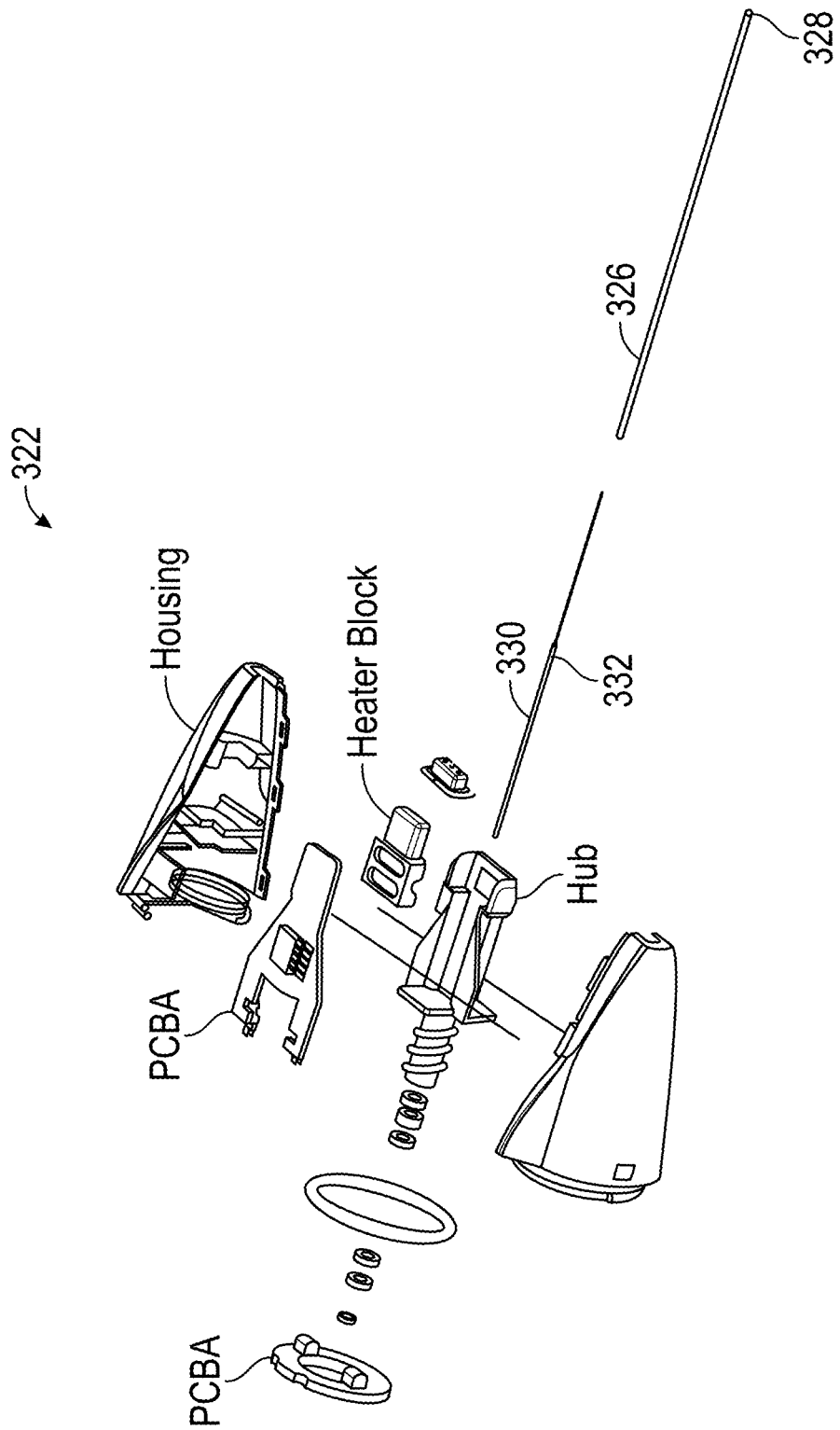

FIGS. 3C and 3D illustrates a detachable probe tip 322 having a hub connector 324 and an elongated probe 326. The probe tip 322 shares much of its construction with probe 300. However, the elongated probe 326 features a blunt tip 328 that is adapted for blunt dissection of tissue. The blunt tip 328 can feature a full radius tip, less than a full radius tip, or conical tip. In some embodiments, a dulled or truncated needle is used. The elongated probe 326 can be 20 gauge or smaller in diameter, and in some embodiments range in size from 25-30 gauge. As with the embodiments described above, an internal supply tube 330 extends in cantilever. However, the exit of the supply tube 330 can be disposed at positions within the elongated probe 326 other than proximate the blunt tip 328. Further, the supply tube 330 can be adapted to create an elongated zone of cooling, e.g., by having multiple exit points for cooling fluid to exit from.

The elongated probe 326 and supply tube 330 may be configured to resiliently bend in use, throughout their length at angles approaching 120°, with a 5-10 mm bend radius. This may be challenging considering the small sizes of the elongated probe 326 and supply tube 330, and also considering that the supply tube 330 is often constructed from fused silica. Accordingly, the elongated probe 326 can be constructed from a resilient material, such as stainless steel, and of a particular diameter and wall thickness (0.004 to 1.0 mm), such that the elongated probe in combination with the supply tube 330 is not overly resilient so as to overtly resist manipulation, but sufficiently strong so as to prevent kinking that can result in cooling fluid escaping. For example, the elongated probe can be 15 gauge or smaller in diameter, even ranging from 20-30 gauge in diameter. The elongated probe can have a very disparate length to diameter ratio, for example, the elongated probe can be greater than 30 mm in length, and in some cases range from 30-150 mm in length (e.g., 90 mm length). To further the aforementioned goals, the supply tube 330 can include a polymer coating 332, such as a polyimide coating that terminates approximately halfway down its length, to resist kinking and aid in resiliency. The polymer coating 332 can be a secondary coating over a primary polyimide coating that extends fully along the supply tube. However, it should be understood that the coating is not limited to polyimide, and other suitable materials can be used. In some embodiments, the flexibility of the elongated probe 326 will vary from the proximal end to the distal end. For example, by creating certain portions that have more or less flexibility than others. This may be done, for example, by modifying wall thickness, adding material (such as the cladding discussed above), and/or heat treating certain portions of the elongated probe 326 and/or supply tube 330. For example, decreasing the flexibility of elongated probe 326 along the proximal end can improve the transfer of force from the hand piece to the elongated probe end for better feel and easier tip placement for treatment. The elongated probe and supply line 330 may be configured to resiliently bend in use to different degrees along the length at angles approaching 120°, with a varying bend radius as small as 5 mm. In some embodiments, the elongated probe 326 will have external markings along the needle shaft indicating the length of needle inserted into the tissue.

In some embodiments, the probe tip 322 does not include a heating element, such as the heater described with reference to probe 300, since the effective treating portion of the elongated probe 326 (i.e., the area of the elongated probe where a cooling zone emanates from) is well laterally displaced from the hub connector 324 and elongated probe proximal junction. Embodiments of the supply tube are further described below and within commonly assigned U.S. Pub. No. 2012/0089211, the entirety of which is incorporated by reference herein.

Figure 4A:
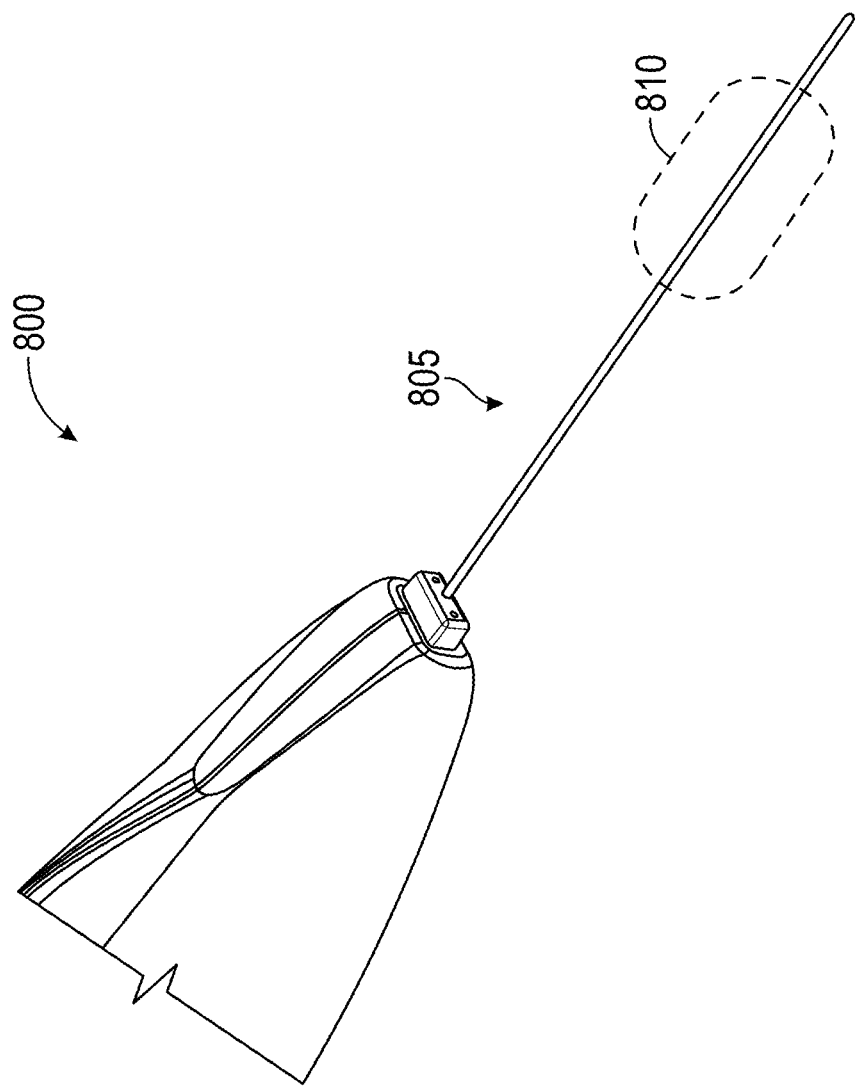
FIGS. 4A and 4B illustrate an exemplary system according to some embodiments.
Figure 4B:
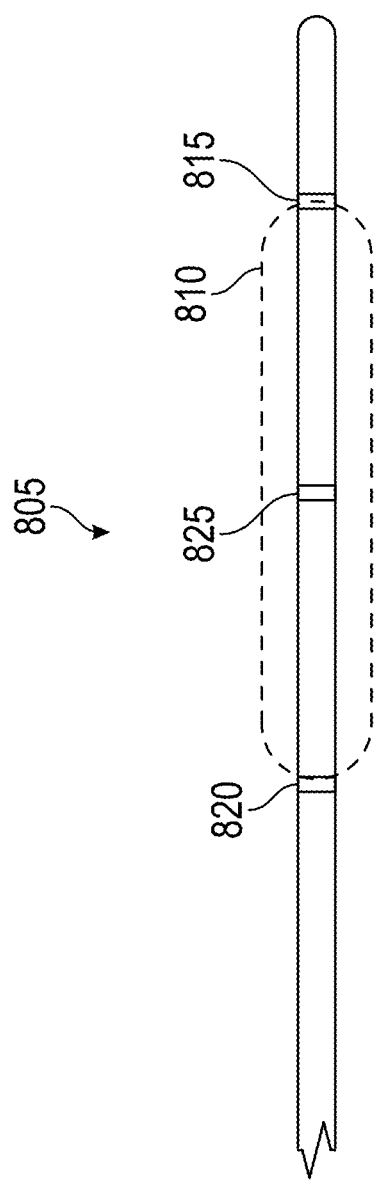

FIGS. 4A-4B illustrate a distal end of an exemplary probe 800 for treating a nerve according to some embodiments. The probe 800 may have a needle 805 extending distally that is configured to generate a cooling zone or cryozone (may be defined by the 0° C. isotherm) 810. In some embodiments, 0° C. is a minimum isotherm temperature. In some embodiments, as illustrated in the close up of needle 805 in FIG. 4B, the needle 805 may include one or more marks along the length of the needle. The one or more marks may include a mark 815 for marking a distal end of the cryozone 810 that is generated by the probe 800, a mark 820 for marking a proximal end of the cryozone 810 that is generated by the probe 800, and/or a mark 825 for marking a center of a the cryozone 810 that is generated by the probe 800.

Figure 5:
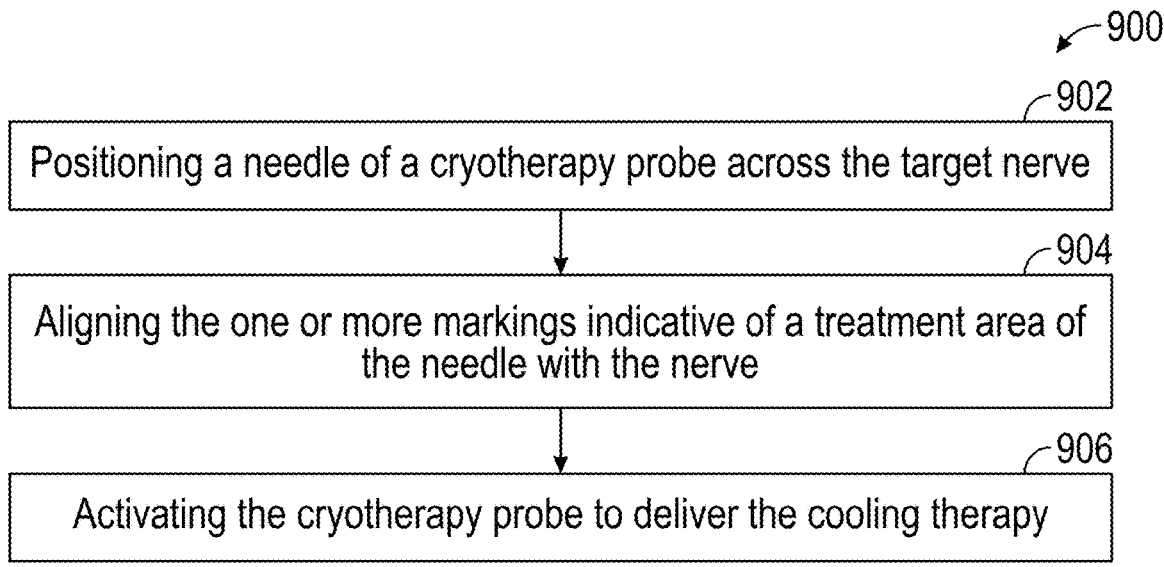
FIG. 5 illustrates an exemplary method of treating a nerve according to some embodiments.

The marks 815, 820, 825 may be utilized for visually aligning the needle 805 of a probe 800 with a target nerve. For example, FIG. 5 illustrates an exemplary method 900 of treating a nerve according to some embodiments. At step 902, a needle of the cryotherapy probe is positioned across the target nerve. The one or more markings indicative of a treatment area (e.g., marks 815, 820, 825) of the needle may be aligned with the nerve 904. After alignment, the cryotherapy probe may be activated to deliver the cryogenic or cooling therapy 906.

In some embodiments, the needle may be provided with an echogenic coating that makes the needle more visible under ultrasound imaging. For example, in some embodiments, the entire length of the needle may be provided with an echogenic coating. Alternatively, the one or more of the marks 815, 820, 825, may be provided with an echogenic coating such that the distal end, proximal end, or center of the cryozone associated with the needle is visible under ultrasound imaging. In other embodiments, the one or more marks may be provided by a lack of echogenic coating. For example, in some embodiments, the length of the needle may be provided with an echogenic coating except for at the one or more marks 815, 820, 825, such that when viewed under ultrasound guidance, the distal, proximal, or center of the cryozone would be associated with the portion of the needle without the echogenic coating. Alternatively, the length of the needle may be provided with the echogenic coating that ceases at the center of the associated cryozone, such that when viewed under ultrasound guidance, the distal end of the echogenic coating would be associated with a center of a cryozone of the needle.

Long needles may be used in some embodiments (e.g., 8-15 mm, 20 mm, 90 mm, etc.). Longer needles may require a smaller gauge (larger diameter) needle so they have sufficient rigidity for improved control while positioning of the distal end deep in the tissue, but not so large as to create significant mechanical injury to the skin and tissue when inserted (e.g., greater diameter than 20 G). Alternate configurations of the device may have two or more needles spaced generally 2-5 mm apart of lengths ranging from up to 20 mm or greater, typically of 27 gauge, 25 gauge or 23 gauge. Single needle configurations may be even longer (e.g., 90 mm) for reaching target tissues that are even deeper (e.g., >15 mm or so below the dermis). Longer needle devices (e.g., >10 mm) may not need active heating of the skin warmer and/or cladding found in designs using shorter needle(s), as the cooling zone may be placed sufficiently deep below the dermis to prevent injury. In some embodiments, devices with single long needle configurations may benefit from active nerve location such as ultrasound or electrical nerve stimulation to guide placement of the needle. Further, larger targets may require treatment from both sides to make sure that the cold zone created by the needle fully covers the target. Adjacent treatments placing the needle to either side of a nerve during two successive treatment cycles may still provide an effective treatment of the entire nerve cross-section.

In some situations, a probe with multiple spaced apart needles may be preferable (e.g., 2, 3, 4 or more). A device employing multiple needles may decrease the total treatment duration by creating larger cooling zones. Further, a multi-needle device may be configured to provide continuous cooling zones between the spaced apart needles. In some embodiments, the needles may be spaced apart by 1-5 mm. The spacing may be dependent on the type of tissue being targeted. For example, when targeting a nerve, it may be preferable to position the nerve between the two or more needles so that cooling zones are generated on both sides of the nerve. Treating the nerve from both sides may increase the probability that the entire cross-section of the nerve will be treated. For superficial peripheral nerves, the nerves may be at depths ranging from 2-6 mm and may be smaller in diameter, typically <2 mm. Accordingly, devices for treating superficial peripheral nerves may include two or more 27 gauge needles spaced ≤2 mm apart and having typical lengths less than 7 mm (e.g., 6.9 mm); however longer needles may be required to treat the full patient population in order to access patients with altered nerve anatomy or patients with higher amounts of subcutaneous tissue such as those with high BMIs.

A treatment cycle may include a 10 second pre-warm phase, followed by a 60 second cooling phase, followed thereafter by a 15 second post-warm phase with 40° C. skin warmer throughout. It should be understood that other treatment cycles may be implemented. In some embodiments, a pre-warming cycle can range from 0 to up to 30 seconds, preferably 5-15 seconds sufficient to pre-warm the cryoprobe and opposing skin. Treatment cooling may range from 5-120 seconds, preferably 15-60 seconds based on the flow rate, geometry of the cryoprobe, size of the therapy zone, size of the target nerve or tissue and the mechanism of action desired. Post-warming can range from 0-120 seconds, preferably less than 60 seconds, more preferably 10-15 seconds sufficient to return the cryoprobe to a steady state thermal condition and possibly to free the cryoprobe needle(s) from the frozen therapy zone (e.g., at least 0° C.) prior to removing the cryoprobe needles. For example, in some embodiments, devices with 6.9 mm long cladded needles may be warmed with a 30° C. heater. The treatment cycle may include a 10 second pre-warm phase, a 35 second cooling phase, and a 15 second post-warm phase. Advantageously, such a treatment cycle may make an equivalent cryozone as the treatment cycle used in the study in a shorter amount of time (e.g., a 35 second cooling phase compared to a 60 second cooling phase).

In some embodiments, treatment devices and treatment cycles may be configured to deliver a preferred cryozone volume. For example, in some embodiments, devices and treatment cycles may be configured to generate cryozones having a cross-sectional area of approximately 14-55 mm$^2$ (e.g., 27 mm$^2$). Optionally, the devices and treatment cycles may be configured to generate cryozones having a volume of approximately 65-125 mm$^3$ (e.g., 85 mm$^3$).

Accordingly, in some embodiments, treatment cycles may be configured with cooling phases ranging between 15-75 seconds (e.g., 30 seconds, 35 seconds, 40 seconds, 45 seconds, etc.) depending on cooling fluid flow rates, warming phase durations, warming phase temperature, number of cooling needles, needle spacing, or the like in order to generate a desired cryozone. Similarly, treatment cycles may be configured with warming phases operating a temperature ranging between 10-45° C. depending on the length of cooling phases, number of needles, needle spacing, etc., in order to generate a desired cryozone. In some embodiments the temperature can be set to one temperature during the pre-warm phase, another temperature during the cooling phase, and a third temperature during the post-warm phase.

In some embodiments, devices may be configured to limit flow rate of a cooling fluid to approximately 0.25-2.0 SLPM, or 0.34-1.0 SLPM (gas phase). Optionally, in some embodiments, it may be preferable to configure the device and the treatment cycle to maintain the tip at less than −55° C. during cooling phases. In some embodiments, it may be preferable to configure the device and the treatment cycle to have the tip return to at least 0° C. at the end of the post-warm phase so as to ensure the device may be safely removed from the tissue after the treatment cycle.

While generally describing treatment cycles as including pre-heating/warming phases, it should be understood that other treatment cycles may not require a pre-heating/warming phase. For example, larger needle devices (e.g., 30-90 mm) may not require a pre-heat/warm phase. Larger needles may rely on the body's natural heat to bring the needle to a desired temperature prior to a cooling phase.

In certain embodiments, the systems and methods described herein can be used to perform cryogenic therapy to block or reduce sympathetic stimulation to the cardiovascular system. In certain embodiments, the systems and methods described herein can be used to perform cryogenic therapy on the stellate ganglion and/or autonomic tissue peripheral to the stellate ganglion to block or reduce sympathetic stimulation of the cardiovascular system. In certain embodiments, the systems and methods described herein can be used to perform cryogenic therapy on the cardiac pole of the stellate ganglion. In certain embodiments, stimulation of the cardiovascular system can be affected by the paravertebral chain such as for example, the C7, C8, T1, and T2 regions (for example, the C7, C8, T1, and T2 paravertebral ganglia) of the paravertebral chain. For example, efferent sympathetic fibers can project from the C7-T2 regions of the paravertebral chain to the heart through the stellate ganglion. In some embodiments, the systems and methods described herein can be used to perform cryogenic therapy on one or more of the C7, C8, T1, and T2 regions (for example, one or more of the C7, C8, T1, and T2 paravertebral ganglia). In some embodiments, the systems and methods described herein can be used to perform cryogenic therapy on one or more of the C7, C8, T1, and T2 regions of the paravertebral chain (for example, one or more of the C7, C8, T1, and T2 paravertebral ganglia) to block or reduce sympathetic stimulation of the cardiovascular system. In some patients, the C7, C8, T1, and T2 paravertebral ganglia are fused to form the stellate ganglion. In certain embodiments, stimulation of the cardiovascular system may also be affected by several other regions of the sympathetic nervous system peripheral to the stellate ganglion. For example, in some patients, the T2 paravertebral ganglia is not part of the stellate ganglion. Additionally, in some patients, the T1 nerve and/or the T2 nerve can provide sympathetic stimulation to the heart at least partially through alternative pathways that bypass the stellate ganglion. In some patients, the systems and methods described herein can be used to perform cryogenic therapy on one or more autonomic tissue regions peripheral to the stellate ganglion, such as the T2 paravertebral ganglia in patients in which it does not form part of the stellate ganglion or one or more other portions of the T1 and/or T2 regions that bypass the stellate ganglion to provide sympathetic stimulation to the cardiovascular system. In some embodiments, the systems and methods described herein can be used to perform cryogenic therapy on the C6 region of the paravertebral chain (for example, the C6 paravertebral ganglia) to block or reduce sympathetic stimulation of the cardiovascular system.

In some embodiments, the systems and methods described herein can be used to perform cryogenic therapy on one or more of the T1 region of the paravertebral chain, the T2 region of the paravertebral chain, and the stellate ganglion in order to block or reduce sympathetic stimulation of the cardiovascular system.

In some embodiments, the systems and methods described herein can be used to perform cryogenic therapy to reduce sympathetic stimulation to the cardiovascular system or the ability of the sympathetic nervous system to stimulate the cardiovascular system by at least 25%, at least 35%, at least 45%, at least 50%, at least 55%, at least 65%, at least 75%, at least 80%, at least 85%, at least 90%, or any other suitable amount or degree, as compared to the amount or degree of stimulation without the use of the cryogenic therapy under the same condition. In some embodiments, the systems and methods described herein can be used to perform cryogenic therapy to reduce sympathetic stimulation to the cardiovascular system or the ability of the sympathetic nervous system to stimulate the cardiovascular system by between 25% and 75%, between 35% and 65%, between 25% and 50%, between 50% and 75%, or any other suitable ranges.

In some embodiments, the systems and methods described herein can be used to perform cryogenic therapy to reduce innervation to the cardiovascular system by at least 25%, at least 35%, at least 45%, at least 50%, at least 55%, at least 65%, at least 75%, at least 80%, at least 85%, at least 90%, or any other suitable amount or degree, as compared to the amount or degree of innervation without the use of the cryogenic therapy under the same condition. In some embodiments, the systems and methods described herein can be used to perform cryogenic therapy to reduce innervation to the cardiovascular system by between 25% and 75%, between 35% and 65%, between 25% and 50%, between 50% and 75%, or any other suitable range.

In some embodiments, the systems and methods described herein can be used to perform cryogenic therapy to reduce the release of catecholamines to the cardiovascular system or the ability of the sympathetic nervous system to release catecholamines to the cardiovascular system by at least 25%, at least 35%, at least 45%, at least 50%, at least 55%, at least 65%, at least 75%, at least 80%, at least 85%, at least 90%, or any other suitable amount, as compared to the amount of catecholamines release without the use of the cryogenic therapy under the same condition. In some embodiments, the systems and methods described herein can be used to perform cryogenic therapy to reduce the release of catecholamines to the cardiovascular system or the ability of the sympathetic nervous system to release catecholamines to the cardiovascular system by between 25% and 75%, between 35% and 65%, between 25% and 50%, between 50% and 75%, or any other suitable range.

In some embodiments, the systems and methods described herein can be used to perform cryogenic therapy to cause axonotmesis of at least 25%, at least 35%, at least 45%, at least 50%, at least 55%, at least 65%, at least 75%, at least 80%, at least 85%, or at least 90% of the nerves that provide sympathetic stimulation to the cardiovascular system, or any other suitable amount or degree, as compared to the amount or degree of axonotmesis of the nerves that provide sympathetic stimulation to the cardiovascular system without the use of the cryogenic therapy under the same condition. In some embodiments, the systems and methods described herein can be used to perform cryogenic therapy to cause axonotmesis of between 25% and 75%, between 35% and 65%, between 25% and 50%, or between 50% and 75% of the nerves that provide sympathetic stimulation to the cardiovascular system, or any other suitable range.

In some embodiments, the systems and methods described herein can be used to perform cryogenic therapy to cause axonotmesis of at least 25%, at least 35%, at least 45%, at least 50%, at least 55%, at least 65%, at least 75%, at least 80%, at least 85%, or at least 90% of the nerves of the stellate ganglion and/or autonomic tissue peripheral to the stellate ganglion, or any other suitable amount or degree, as compared to the amount or degree of axonotmesis of the nerves of the stellate ganglion and/or autonomic tissue peripheral to the stellate ganglion without the use of the cryogenic therapy under the same condition. In some embodiments, the systems and methods described herein can be used to perform cryogenic therapy to cause axonotmesis of between 25% and 75%, between 35% and 65%, between 25% and 50%, or between 50% and 75% of the nerves of the stellate ganglion, or any other suitable range.

Figure 6:
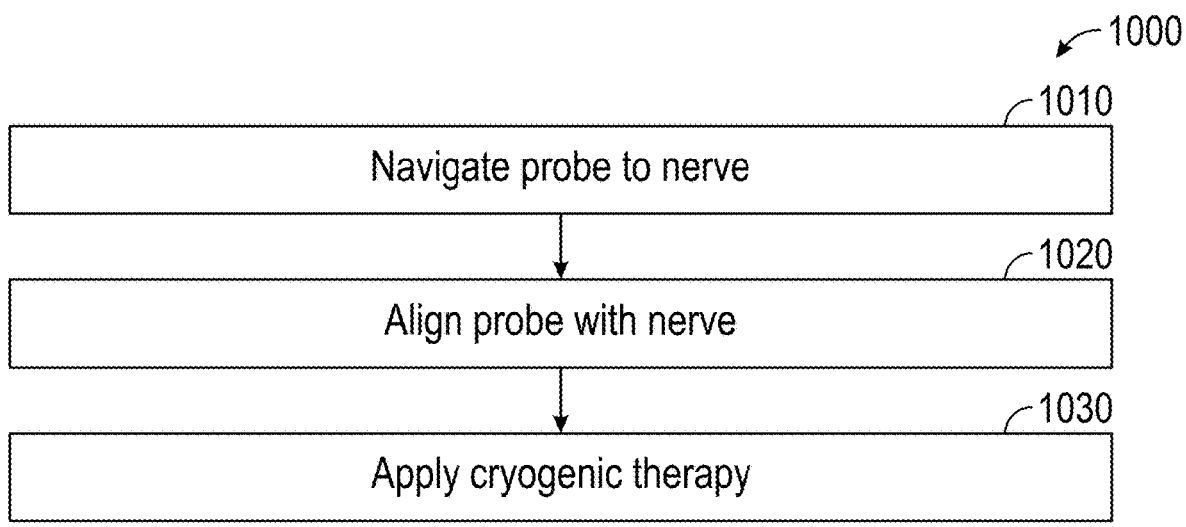
FIG. 6 illustrates an exemplary method of treating a nerve of the stellate ganglion or autonomic tissue peripheral to the stellate ganglion according to some embodiments.

FIG. 6 shows an embodiment of a method 1000 of performing cryogenic therapy on the stellate ganglion (for example, the left stellate ganglion, the right stellate ganglion, or both the left stellate ganglion and the right stellate ganglion) and/or autonomic tissue peripheral to the stellate ganglion. In some embodiments, cryogenic therapy of the left stellate ganglion may be preferable to avoid affecting the recurrent laryngeal nerve. As described above, the method 1000 can also be performed on other nerves that provide sympathetic stimulation to the cardiovascular system, alternatively or in addition to the stellate ganglion.

Figure 7:
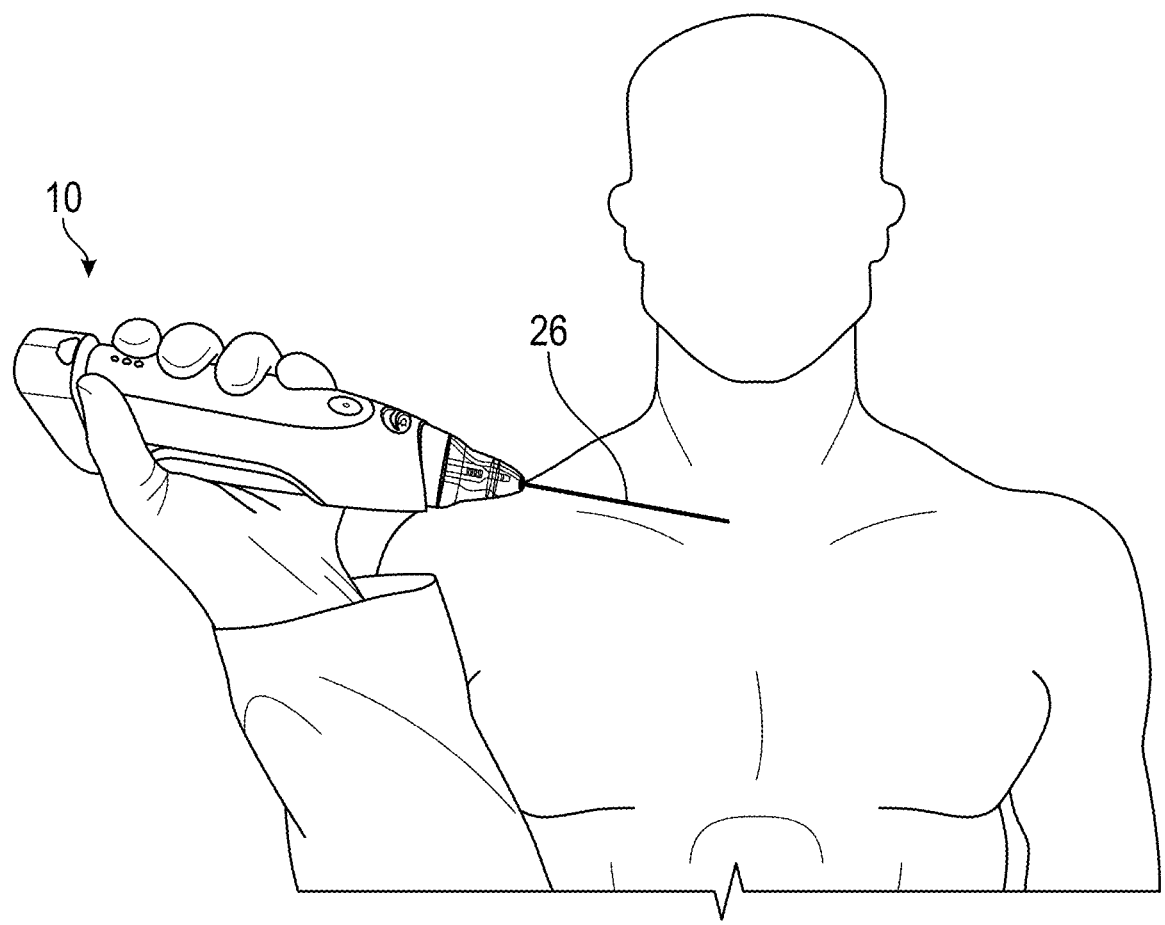
FIG. 7 illustrates an example of a percutaneous delivery of a cryogenic probe to the stellate ganglion or autonomic tissue peripheral to the stellate ganglion.

At a first step 1010, a probe of a cryogenic therapy system is navigated to the stellate ganglion and/or autonomic tissue peripheral to the stellate ganglion. The probe may be part of a hand-held apparatus containing much or all of the cryogenic therapy system as described in the embodiments herein. In certain embodiments, the probe can have a length of between 25 mm and 205 mm, between 55 mm and 175 mm, between 25 mm and 85 mm, between 35 mm and 75 mm, between 45 mm and 65 mm, between 60 mm and 120 mm, between 70 mm and 110 mm, between 80 mm and 100 mm, between 130 mm and 190 mm, between 140 mm and 180 mm, between 150 mm and 170 mm, between 145 mm and 205 mm, between 155 mm and 195 mm, between 165 mm and 185 mm, between 95 mm and 330 mm, between 125 mm and 300 mm, between 95 mm and 155 mm, between 105 mm and 145 mm, between 115 mm and 135 mm, between 270 mm and 330 mm, between 280 mm and 320 mm, between 290 mm and 310 mm, or any other suitable range. In certain embodiments, the probe can have a length of 55 mm or about 55 mm, 90 mm or about 90 mm, 160 mm or about 160 mm, 300 mm or about 300 mm, or any other suitable length. In certain embodiments, the probe can have a length of at least 55 mm or no more than 300 mm. In certain embodiments, the probe can be inserted percutaneously (for example, as shown in FIG. 7) and navigated to the stellate ganglion and/or autonomic tissue peripheral to the stellate ganglion. A probe inserted percutaneously can have a length of between 25 mm and 205 mm, between 55 mm and 175 mm, between 25 mm and 85 mm, between 35 mm and 75 mm, between 45 mm and 65 mm, between 60 mm and 120 mm, between 70 mm and 110 mm, between 80 mm and 100 mm, between 130 mm and 190 mm, between 140 mm and 180 mm, between 150 mm and 170 mm, between 145 mm and 205 mm, between 155 mm and 195 mm, between 165 mm and 185 mm, or any other suitable range. In some embodiments, the probe is inserted percutaneously adjacent to the carotid artery and the sternocleidomastoid (SCM) muscle. In certain embodiments, the probe can be introduced to the stellate ganglion and/or autonomic tissue peripheral to the stellate ganglion in an open surgery. In certain embodiments, a probe inserted in an open surgery may have a length of between 95 mm and 330 mm, between 125 mm and 300 mm, between 95 mm and 155 mm, between 105 mm and 145 mm, between 115 mm and 135 mm, between 130 mm and 190 mm, between 140 mm and 180 mm, between 150 mm and 170 mm, between 270 mm and 330 mm, between 280 mm and 320 mm, between 290 mm and 310 mm, or any other suitable range. In certain embodiments, the probe can be inserted via a thoracic approach, for example, using VATS. In certain embodiments, a probe inserted using a thoracic approach may have a length of between 95 mm and 330 mm, between 125 mm and 300 mm, between 95 mm and 155 mm, between 105 mm and 145 mm, between 115 mm and 135 mm, between 130 mm and 190 mm, between 140 mm and 180 mm, between 150 mm and 170 mm, between 270 mm and 330 mm, between 280 mm and 320 mm, between 290 mm and 310 mm, or any other suitable range.

In certain embodiments, the probe can be navigated using fluoroscopic or ultrasound imaging. In some embodiments, the probe can be navigated using fluoroscopic or ultrasound imaging of an echogenic coating. In other embodiments, the probe can be navigated using direct vision. For example, the probe can be navigated using direct via direct vision in open surgery. In certain embodiments, one or more introducers or dilators may be used to provide a path for navigation of the probe to the stellate ganglion and/or autonomic tissue peripheral to the stellate ganglion. The one or more introducers or dilators can be placed using fluoroscopic or ultrasound imaging to provide access to the stellate ganglion and/or autonomic tissue peripheral to the stellate ganglion.

After the probe is navigated to the stellate ganglion and/or autonomic tissue peripheral to the stellate ganglion, the probe is aligned with one or more nerves of the stellate ganglion and/or autonomic tissue peripheral to the stellate ganglion at a step 1020. The probe can be aligned so that a cooling zone or cryozone (for example, an ice-ball) created by the probe will contact or otherwise affect the desired nerve(s). For example, the probe can be inserted into the nerve(s) or positioned adjacent the nerve(s) so that the cooling zone or cryozone will contact or otherwise effect the desired nerve(s). In some embodiments, the cooling zone or cryozone can have a cross-sectional area of between 4 mm to 12 mm by between 10 mm to 32 mm. In some embodiments, the cooling zone or cryozone can have a cross-sectional area of between 6 mm to 10 mm by between 12 mm to 30 mm. In some embodiments, the cooling zone or cryozone can have a cross-sectional area of 7.5 mm or about 7.5 mm by 17 mm or about 17 mm (for example, when the probe has a length of 90 mm or about 90 mm). In some embodiments, the cooling zone or cryozone can have a cross-sectional area of between 40 $mm^2$ and 384 $mm^2$, between 72 $mm^2$ and 300 $mm^2$, between 100 $mm^2$ and 160 $mm^2$, between 110 $mm^2$ and 150 $mm^2$, between 120 $mm^2$ and 140 $mm^2$, or any other suitable range.

After the probe is aligned, cryogenic therapy is applied to the nerve(s) at a step 1030. In certain embodiments, one or more parameters of a cryogenic therapy treatment (temperature, time, cycling, pulsing, ramp rates for cooling, etc.) can be controlled to at least temporarily disable the nerve(s) of the stellate ganglion (for example, the left stellate ganglion or both the left stellate ganglion and the right stellate ganglion) and/or autonomic tissue peripheral to the stellate ganglion, for example, to interrupt sympathetic pathways to the heart. For example, in certain embodiments, the probe can apply a temperature between −20° and −100° C. or between −80° and −90° C., such as −88° C., to cause axonotmesis of the nerve(s) of the stellate ganglion and/or autonomic tissue peripheral to the stellate ganglion (for example, to cause 2nd degree Wallerian degeneration of the axon and myelinated sheath). In certain embodiments, the probe can apply cryogenic therapy to the nerve(s) for between 30 seconds and 10 minutes, between 30 seconds and 8 minutes, between 1 minute and six minutes, between 1 minute and 4 minutes, between 2 minutes and 3 minutes, or any other suitable range.

The degeneration of the axon and myelin sheath can temporarily block nerve signals of the treated nerve. Post treatment, the axon can regenerate at a rate of about 1 to 2 mm per day. After the axon and myelin sheath are fully regenerated, nerve signaling is restored.

Disabling the nerves of the stellate ganglion and/or autonomic tissue peripheral to the stellate ganglion using cryogenic therapy can provide for management of various structural heart conditions such as arrhythmia or cardiac electrical storm by temporarily blocking nerve signals so as to temporarily interrupt sympathetic stimulation to the heart. For example, sympathetic inhibition using the systems and methods described herein can suppress ventricular arrhythmias, such as those taking place during cardiac electrical storm. Therefore, disabling the nerves of the stellate ganglion and/or autonomic tissue peripheral to the stellate ganglion using cryogenic therapy may act as an alternative to a local anesthetic stellate ganglion block.

In certain embodiments, disabling the nerves of the stellate ganglion and/or autonomic tissue peripheral to the stellate ganglion using cryogenic therapy as described herein can be used to treat a patient who has suffered from or is at risk of suffering from atrial tachyarrhythmia or refractory atrial tachyarrhythmia. In certain embodiments, disabling the nerves of the stellate ganglion and/or autonomic tissue peripheral to the stellate ganglion using cryogenic therapy as described herein can be used to treat a patient who has suffered from or is at risk of suffering from ventricular arrhythmia, ventricular tachycardia, ventricular fibrillation, refractory ventricular arrhythmia, refractory ventricular tachycardia, or refractory ventricular fibrillation. In certain embodiments, disabling the nerves of the stellate ganglion and/or autonomic tissue peripheral to the stellate ganglion using cryogenic therapy as described herein can be used to treat a patient who has suffered from or is at risk of suffering from long QT syndrome, ischemic cardiomyopathy, dilated cardiomyopathy, valvular heart disease, acute myocardial infarction, or ongoing myocardial ischemia, or combinations thereof. In certain embodiments, disabling the nerves of the stellate ganglion and/or autonomic tissue peripheral to the stellate ganglion using cryogenic therapy as described herein can be used to treat a patient who has suffered from or is at risk of suffering from cardiac dysrhythmia following heart surgery.

In certain embodiments, the methods described herein can be used to treat a patient having an implantable cardioverter-defibrillator (ICD). For example, cardiac electrical storm can occur in patients having an ICD. The methods herein can be used to treat the cardiac electrical storm and prevent repeated shocks from the ICD.

The methods described herein can allow for both short-term and long-term therapy for structural heart conditions. In certain embodiments, the axonotmesis of the nerve(s) using the cryotherapy systems and methods described herein can provide for relief from the structural conditions for an extended period of time (for example, up to 1, 2, 3, 4, 5, or 6 months) to allow time for an additional treatment, such as a heart transplant or implantation of a mechanical circulatory support device or left ventricular assist device. In certain embodiments, the cryotherapy systems and methods described herein can advantageously be used to remodel the nerve(s) of the stellate ganglion and/or autonomic tissue peripheral to the stellate ganglion. For example, as described herein, the probes of certain embodiments can cause axonotmesis of the nerve(s) of the stellate ganglion and/or autonomic tissue peripheral to the stellate ganglion, and the axon and myelin sheath can regenerate post-treatment. In certain embodiments, the nerve(s) may regenerate with a desired change in structure and/or function. For example, in certain embodiments in which cooling therapy is used to treat a condition such as arrhythmia or cardiac electrical storm, the nerves can regenerate with a modified structure and/or function such that the treated condition no longer occurs following regeneration. For example, in certain embodiments, following regeneration, innervation may be reduced so that the previous condition no longer occurs. In certain embodiments, the nerves may be regenerate with new sodium channels having improved anatomical structures and/or function.

EXAMPLES

Additional embodiments are disclosed in further detail in the following examples, which are not in any way intended to limit the scope of the claims.

Example 1—Acute Study in Normal Animals

In a first experiment, the effects of cryotherapy of the T1 and T2 regions of the paravertebral chain of the stellate ganglion to mitigate functional sympathetic efferent control of the heart is evaluated. Acute efficacy and short-term persistence of cryotherapy to the T1 and T2 regions is defined.

Cryotherapy is applied to the T1 and T2 regions of the paravertebral chain of the stellate ganglion of an animal via an open surgery through the chest with direct visualization of the right and left stellate ganglion. Sympathetic-induced changes in heart rate, PR interval, left ventricular pressure (and first derivative of LV pressure) and ventricular activation-recovery interval is measured. Tissue from the T1 and T2 regions of the paravertebral chain is harvested to examine the effects of the cryotherapy. This procedure is performed on 10 porcine mini pigs. Four mapping arrays, bipolar stellate stimulation cuffs, and three Millar pressure catheters are utilized. Further cryoneurolysis of C7 and C8 regions of the paravertebral chain of the stellate ganglion, although not performed in the present example because the exposed areas are treated, could also be performed.

Example 2—Chronic Infarct Model—Acute Intervention with Cryotherapy

In a second experiment, the potential cardioprotective effects of cryotherapy of the T1 and T2 regions of the paravertebral chain of the stellate ganglion in a chronic myocardial infarction model with demonstrated ventricular arrythmia susceptibility is defined.

The model is created by anesthetizing an animal and inducing myocardial infarction by microsphere injection of the left anterior descending coronary artery in a closed chest procedure. The animal is recovered and terminated six weeks later.

The study is conducted by anesthetizing the animal and instrumenting the animal with the same instrumentation as described in Example 1 with the addition of neurochemical detection probes to assess norepinephrine release and neuropeptide Y release.

In a step (a), sympathetic-induced changes in heart rate, PR interval, left ventricular pressure (and first derivative of LV pressure) and ventricular activation-recovery interval are measured. In a step (b), programmed stimulation to define ventricular tachycardia inducibility is performed. Acute cryotherapy of the T1 and T2 regions is performed and steps (a) and (b) are repeated. The entire procedure is then repeated for the contralateral stellate ganglion paravertebral chain.

Samples from scar, border zone, and remote myocardium are harvested to define remodeling of myocytes and the neural interface in the diseased heart.

This procedure is performed on 14 porcine mini pigs. Seven of the porcine minipigs receive a right side stellate ganglion block first. Seven of the porcine mini pigs receive a left side stellate ganglion block first. By the end of the terminal procedure, both sides are blocked for each mini pig. Three mapping arrays, fourteen bipolar stellate stimulation cuffs, his-bundle electrodes, and three Millar pressure catheters are used. Additional equipment for histology, immunohistochemistry, and neurochemical detection are also used.

Example 3—Chronic Study in Normal Animals

In a third experiment, (a) a safety study for cryotherapy of the stellate ganglion is performed, and (b) long-term efficacy of cryotherapy of the T1 and T2 regions to mitigate functional sympathetic efferent control of the heart is defined.

For the safety study, telemetry devices are implanted in animals 2 weeks before cryotherapy. Baseline measurements of heart rate variability is determined in conscious animals. Cryotherapy is applied to the stellate ganglion. Post-cryotherapy, heart rate variability measures are obtained weekly until termination of animals at 6 weeks post-cryotherapy.

For the long-term efficacy study, from right thoracotomy (or right VATS), a bipolar cuff electrode is implanted on the T3 and T4 regions of the paravertebral chain and functional sympathetic response to right-sided T3-T4 supramaximal stimulation is evaluated. Sympathetic-induced changes in heart rate, PR interval, left ventricular pressure (and first derivative of LV pressure) and ventricular activation-recovery interval are measured. Cryotherapy is applied to the right T1 and T2 regions. Following cryoablation of right T1 and T2 regions (under direct observation), block efficacy is confirmed by T3-T4 stimulation every 5 min for up to 30 min. Tunnel stimulating electrodes is applied to the subcutaneous pocket. The chest is then closed, and recovery will occur. At the end of the study, the animals are anesthetized and instrumented as described in Example 1.

At the end of the study, sympathetic-induced changes in heart rate, atrioventricular conduction, left ventricular pressure (and first derivative of left ventricular pressure), and ventricular activation-recovery interval are measured. S1-S2 pacing are performed to define ventricular tachycardia inducibility.

This procedure is performed on 12 porcine mini pigs. Seven DSI telemetry units, three mapping arrays, seven bipolar stellate stimulation cuff, three his-bundle electrodes, and three Millar pressure catheters are used.

Example 4—Chronic Disease Model—Chronic Intervention with Cryoablation

In a fourth experiment, a potential cardio protection imparted by early onset reactive cryotherapy of the T1 and T2 regions in an animal model of chronic myocardial infarction is defined.

The model is created by anesthetizing an animal and inducing myocardial infarction by microsphere injection of the left anterior descending coronary artery in a closed chest procedure. The animal is recovered.

Neuromodulation intervention is performed. Seven to ten days after myocardial infarction, the right stellate ganglion is accessed by small thoracotomy (or VATS) and cryotherapy of the T1 and T2 regions is performed. Hemodynamic response to electrical stimulation of the T3 and T4 regions before and after the cryotherapy is performed to confirm efficacy. The animal is recovered after five weeks.

At the end of the study, the animal is anesthetized. Sympathetic-induced changes in heart rate, atrioventricular conduction, left ventricular pressure (and first derivative of left ventricular pressure), ventricular activation-recovery interval, norepinephrine release, and neuropeptide Y release are measured. S1-S2 pacing is performed to define ventricular tachycardia inducibility.

Samples from scar, border zone, and remote myocardium are harvested to define remodeling of myocytes and the neural interface in the diseased heart. Tissue from Example 3 is used as untreated control for this example. This procedure is performed on 10 porcine mini pigs. Ten DSI telemetry units, three mapping arrays, ten bipolar stellate stimulation cuffs, his-bundle electrodes, and three Millar pressure catheters are used. Additional equipment for histology, immunohistochemistry, and neurochemical detection are also used.

The use of "or" or "and" means "and/or" unless stated otherwise. Furthermore, use of the term "including" as well as other forms, such as "include", "includes," and "included," is not limiting. As used in this specification, whether in a transitional phrase or in the body of the claim, the terms "comprise(s)" and "comprising" are to be interpreted as having an open-ended meaning. That is, the terms are to be interpreted synonymously with the phrases "having at least" or "including at least." When used in the context of a process, the term "comprising" means that the process includes at least the recited steps, but may include additional steps. When used in the context of a compound, composition, or device, the term "comprising" means that the compound, composition, or device includes at least the recited features or components, but may also include additional features or components.

While the present application has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the present invention. All such modifications are intended to be within the scope of the claims appended hereto.

What is claimed is:

1. A method of interrupting sympathetic stimulation to the cardiovascular system of a patient in need thereof, comprising:
   navigating a probe of a hand-held cryogenic therapy apparatus to a stellate ganglion or an autonomic tissue area peripheral to the stellate ganglion of the patient, the probe comprising a needle configured to produce a cooling zone for focused cryogenic therapy;
   aligning the needle with one or more desired nerves of the stellate ganglion or the autonomic tissue area peripheral to the stellate ganglion; and
   producing the cooling zone to provide cryogenic therapy to the desired nerves of the stellate ganglion or the autonomic tissue area peripheral to the stellate ganglion at a temperature sufficient to cause axonotmesis of the nerves.

2. The method of claim 1, wherein the temperature is between −80° C. and −90° C.

3. The method of claim 2, wherein the cryogenic therapy to the one or more desired nerves of the stellate ganglion or the autonomic tissue area peripheral to the stellate ganglion is administered for between 1 minute and 4 minutes.

4. The method of claim 1, wherein navigating the probe to the stellate ganglion or the autonomic tissue area peripheral to the stellate ganglion comprises inserting the probe percutaneously or inserting the probe in an open surgery.

5. The method of claim 1, wherein navigating the probe to the stellate ganglion or the autonomic tissue area peripheral to the stellate ganglion comprises guiding the probe using fluoroscopic or ultrasound imaging.

6. The method of claim 1, further comprising inserting one or more dilators or guides into the patient to form a pathway for navigation of the probe to the stellate ganglion or the autonomic tissue area peripheral to the stellate ganglion.

7. The method of claim 1, wherein producing the cooling zone comprises forming an ice-ball about an outer surface of the needle.

8. The method of claim 1, wherein the patient has suffered from or is at risk of suffering from atrial tachyarrhythmia, refractory atrial tachyarrhythmia, ventricular arrhythmia, ventricular tachycardia, ventricular fibrillation, refractory ventricular arrhythmia, refractory ventricular tachycardia, or refractory ventricular fibrillation.

9. The method of claim 1, wherein the patient has suffered from or is at risk of suffering from a cardiac arrhythmia selected from the group consisting of long QT syndrome, ischemic cardiomyopathy, dilated cardiomyopathy, valvular heart disease, acute myocardial infarction, and ongoing myocardial ischemia, and combinations thereof.

10. The method of claim 1, wherein the patient has an implantable cardioverter-defibrillator (ICD).

11. The method of claim 1, wherein the cryogenic therapy results in temporarily interruption of sympathetic stimulation to the cardiovascular system for up to 1, 2, 3, 4, 5, or 6 months.

12. The method of claim 1, wherein the cryogenic therapy causes regeneration of the treated nerves of stellate ganglion or the autonomic tissue area peripheral to the stellate ganglion.

13. The method of claim 1, wherein the cryogenic therapy causes regeneration of one or more sodium channels of the treated nerves of the stellate ganglion or the autonomic tissue area peripheral to the stellate ganglion.

14. The method of claim 1, wherein the one or more desired nerves of the stellate ganglion or the autonomic tissue area peripheral to the stellate ganglion comprise one or more desired nerves of a paravertebral chain.

15. The method of claim 14, wherein the one or more desired nerves of the paravertebral chain comprises one or more desired nerves of one or more of a C7 region of the paravertebral chain, a C8 region of the paravertebral chain, a T1 region of the paravertebral chain, and a T2 region of the paravertebral chain.

16. A method of treating a patient suffering from cardiac electrical storm, comprising:
providing cryogenic therapy to one or more desired nerves of a stellate ganglion or an autonomic tissue area peripheral to the stellate ganglion of the patient, wherein providing the cryogenic therapy comprises:
navigating a probe of a hand-held cryogenic therapy apparatus to the stellate ganglion or the autonomic tissue area peripheral to the stellate ganglion of the patient, the probe comprising a needle configured to produce a cooling zone for focused cryogenic therapy;
aligning the needle with the one or more desired nerves of the stellate ganglion or the autonomic tissue area peripheral to the stellate ganglion; and
producing the cooling zone to provide cryogenic therapy to the desired nerves of the stellate ganglion or the autonomic tissue area peripheral to the stellate ganglion at a temperature sufficient to cause axonotmesis of the nerves.

17. The method of claim 16, further comprising selecting or identifying a patient who has suffered from or is at risk of suffering from cardiac electrical storm.

18. The method of claim 16, wherein the temperature is between −80° C. and −90° C.

19. The method of claim 18, wherein the cryogenic therapy to the one or more desired nerves of the stellate ganglion or the autonomic tissue area peripheral to the stellate ganglion is administered for between 1 minute and 4 minutes.

20. The method of claim 16, wherein navigating the probe to the stellate ganglion or the autonomic tissue area peripheral to the stellate ganglion comprises inserting the probe percutaneously or inserting the probe in an open surgery.

21. The method of claim 16, wherein navigating the probe to the stellate ganglion or the autonomic tissue area peripheral to the stellate ganglion comprises guiding the probe using fluoroscopic or ultrasound imaging.

22. The method of claim 16, further comprising inserting one or more dilators or guides into the patient to form a pathway for navigation of the probe to the stellate ganglion or the autonomic tissue area peripheral to the stellate ganglion.

23. The method of claim 16, wherein producing the cooling zone comprises forming an ice-ball about an outer surface of the needle.

24. The method of claim 16, wherein the patient has suffered from or is at risk of suffering from atrial tachyarrhythmia, refractory atrial tachyarrhythmia, ventricular arrhythmia, ventricular tachycardia, ventricular fibrillation, refractory ventricular arrhythmia, refractory ventricular tachycardia, or refractory ventricular fibrillation.

25. The method of claim 16, wherein the patient has suffered from or is at risk of suffering from a cardiac arrhythmia selected from the group consisting of long QT syndrome, ischemic cardiomyopathy, dilated cardiomyopathy, valvular heart disease, acute myocardial infarction, and ongoing myocardial ischemia, and combinations thereof.

26. The method of claim 16, wherein the patient has an implantable cardioverter-defibrillator (ICD).

27. The method of claim 16, wherein the cryogenic therapy results in temporarily interruption of sympathetic stimulation to the cardiovascular system of the patient for up to 1, 2, 3, 4, 5, or 6 months.

28. The method of claim 16, wherein the cryogenic therapy causes regeneration of the treated nerves of stellate ganglion or the autonomic tissue area peripheral to the stellate ganglion.

29. The method of claim 16, wherein the cryogenic therapy causes regeneration of one or more sodium channels of the treated nerves of the stellate ganglion or the autonomic tissue area peripheral to the stellate ganglion.

30. The method of claim 16, wherein the one or more desired nerves of the stellate ganglion or the autonomic tissue area peripheral to the stellate ganglion comprise one or more desired nerves of a paravertebral chain.

31. The method of claim 30, wherein the one or more desired nerves of the paravertebral chain comprises one or more desired nerves of one or more of a C7 region of the paravertebral chain, a C8 region of the paravertebral chain, a T1 region of the paravertebral chain, and a T2 region of the paravertebral chain.

\* \* \* \* \*